(12) United States Patent
Ono

(10) Patent No.: US 10,851,869 B2
(45) Date of Patent: Dec. 1, 2020

(54) CRANK CAP ASSEMBLY AND INTERNAL COMBUSTION ENGINE

(71) Applicant: TOYOTA JIDOSHA KABUSHIKI KAISHA, Toyota-shi, Aichi-ken (JP)

(72) Inventor: Tomoyuki Ono, Sunto-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 56 days.

(21) Appl. No.: 16/209,157

(22) Filed: Dec. 4, 2018

(65) Prior Publication Data

US 2019/0186594 A1 Jun. 20, 2019

(30) Foreign Application Priority Data

Dec. 15, 2017 (JP) ................................. 2017-241039

(51) Int. Cl.
| | |
|---|---|
| *F16F 15/08* | (2006.01) |
| *F16F 15/14* | (2006.01) |
| *F16J 1/14* | (2006.01) |
| *F16C 9/02* | (2006.01) |
| *F16F 7/108* | (2006.01) |
| *F02F 7/00* | (2006.01) |
| *F16C 7/02* | (2006.01) |
| *F02F 3/00* | (2006.01) |

(52) U.S. Cl.
CPC ........ *F16F 15/1435* (2013.01); *F02F 7/0053* (2013.01); *F16C 9/02* (2013.01); *F16F 7/108* (2013.01); *F16F 15/08* (2013.01); *F16J 1/14* (2013.01); *F02F 3/00* (2013.01); *F16C 7/023* (2013.01)

(58) Field of Classification Search
CPC ........ F16F 15/14; F16F 15/08; F16F 15/1435; F16J 1/14; F02F 3/00; F02F 7/0053; F16C 9/02; F16C 7/023
See application file for complete search history.

(56) References Cited

U.S. PATENT DOCUMENTS 2,637,278 A * 5/1953 Dean ........................ B61C 9/00
105/133
4,362,341 A * 12/1982 Matsumoto ........... F02F 7/0053
384/220

(Continued)

FOREIGN PATENT DOCUMENTS

| CN | 2828414 Y | 10/2006 |
|---|---|---|
| CN | 101675258 A | 3/2010 |

(Continued)

OTHER PUBLICATIONS

EPO Machine Translation of JPS59156147 (U), Oct. 19, 1984 (Year: 1984).*

(Continued)

*Primary Examiner* — Vinh Luong
(74) *Attorney, Agent, or Firm* — Finnegan, Henderson, Farabow, Garrett & Dunner, LLP

(57) ABSTRACT

A crank cap assembly provided with a crank cap rotatably supporting a crankshaft includes a mass portion, two cap bolts fixing the crank cap to an engine body, and an elastic supporter disposed between the two cap bolts. The elastic supporter elastically supports the mass portion with respect to the crank cap in an axial direction of the crankshaft.

20 Claims, 20 Drawing Sheets

(56) References Cited

U.S. PATENT DOCUMENTS

| | | | | |
|---|---|---|---|---|
| 4,926,810 A | * | 5/1990 | Diehl | F02F 7/0007 |
| | | | | 123/192.1 |
| 5,398,651 A | | 3/1995 | Ullrich | |
| 6,044,818 A | * | 4/2000 | Decuir | F02B 75/22 |
| | | | | 123/192.1 |
| 6,745,740 B1 | * | 6/2004 | Decuir | F16C 7/023 |
| | | | | 123/192.1 |
| 8,499,737 B2 | * | 8/2013 | Sicre | F02F 7/0053 |
| | | | | 123/195 C |
| 2016/0298718 A1 | | 10/2016 | Kanda et al. | |
| 2020/0173520 A1 | * | 6/2020 | Ono | F16F 15/08 |

FOREIGN PATENT DOCUMENTS

| | | | | |
|---|---|---|---|---|
| DE | 2716485 A1 | * | 10/1978 | |
| DE | 10325827 A1 | * | 5/2004 | |
| DE | 102015216614 A1 | | 3/2017 | |
| EP | 3499059 A1 | * | 6/2019 | F16F 15/1435 |
| JP | S57-8338 U | | 1/1982 | |
| JP | 59-32712 U | | 2/1984 | |
| JP | 59-59525 U | | 4/1984 | |
| JP | S59-156147 U | | 10/1984 | |
| JP | 3139125 | | 2/2001 | |
| WO | WO 2008/108658 A1 | | 9/2008 | |
| WO | WO 2016/051648 | | 4/2016 | |

OTHER PUBLICATIONS

Otsuka, Masaya, How to Minimize Diesel Combustion Noise by Improving Engine Structure, Proceedings, Society of Automotive Engineers of Japan, Inc., May 18, 2005, No. 36-05, pp. 7-10.

* cited by examiner

CRANK CAP ASSEMBLY AND INTERNAL COMBUSTION ENGINE

INCORPORATION BY REFERENCE

The disclosure of Japanese Patent Application No. 2017-241039 filed on Dec. 15, 2017 including the specification, drawings and abstract is incorporated herein by reference in its entirety.

BACKGROUND

1. Technical Field

The present disclosure relates to a crank cap assembly and an internal combustion engine provided with a plurality of crank cap assemblies.

2. Description of Related Art

It is generally known that resonance depending on internal combustion engine structures causes combustion noise in internal combustion engines (for example, Masaya Otsuka, "How to minimize diesel combustion noise by improving engine structure", Proceedings, Society of Automotive Engineers of Japan. Inc, May 18, 2005, No. 36-05, Page 7 to 10). For this reason, it has been proposed to provide a mechanism for suppressing vibration in an internal combustion engine so as to reduce combustion noise attributable to the resonance as described above (for example, International Publication No. 2016/051648 and Japanese Patent No. 3139125 (JP 3139125 B)).

International Publication No. 2016/051648 proposes a connecting rod cap provided with a connecting rod cap damper. The connecting rod cap damper is configured to have fixed portions respectively fixed to both ends of the connecting rod cap by bolts, a supporter extending between the fixed portions, and a mass portion connected to the middle of the supporter. The supporter is constituted by an arc-shaped thin plate along the outer peripheral edge of the connecting rod cap, and thus the supporter can be elastically deformed in the longitudinal direction of a connecting rod. Accordingly, resonance in the longitudinal direction of the connecting rod can be suppressed.

SUMMARY

A crank cap rotatably supporting a crankshaft also undergoes vibration. The crank cap vibration as described above includes pivoting vibration in which the crank cap vibrates so as to pivot in the front-rear direction of an internal combustion engine (axial direction of the crankshaft) and front-rear bending vibration in which the middle portion of the crank cap curves in the front-rear direction of the internal combustion engine.

The connecting rod cap damper that is disclosed in International Publication No. 2016/051648 is to suppress resonance in the longitudinal direction of a connecting rod and does not necessarily suppress front-rear-direction vibration. Accordingly, at least front-rear bending vibration of a crank cap cannot be sufficiently suppressed even if the connecting rod cap damper as described above is used for the crank cap.

The present disclosure provides a crank cap assembly capable of suppressing front-rear bending vibration occurring in a crank cap and an internal combustion engine provided with a plurality of crank cap assemblies.

A first aspect of the present disclosure relates to a crank cap assembly provided with a crank cap rotatably supporting a crankshaft. The crank cap assembly includes a mass portion, two cap bolts fixing the crank cap to an engine body, and an elastic supporter disposed between the two cap bolts. The elastic supporter elastically supports the mass portion with respect to the crank cap in an axial direction of the crankshaft.

In the crank cap assembly of the first aspect of the present disclosure, the elastic supporter may include an attachment bolt attaching the mass portion to the crank cap, and a first elastic body disposed between the mass portion and the crank cap. The mass portion may have a through hole penetrating the mass portion. The attachment bolt may extend through the through hole and attach the mass portion to the crank cap such that the first elastic body is sandwiched between the mass portion and the crank cap.

In the crank cap assembly of the first aspect of the present disclosure, the first elastic body may be rubber. An elastic modulus of a middle portion of the first elastic body may be larger than an elastic modulus of both end portions of the first elastic body in the axial direction of the crankshaft.

In the crank cap assembly of the first aspect of the present disclosure, the first elastic body may be rubber. An elastic modulus of a middle portion of the first elastic body may be larger than an elastic modulus of both end portions of the first elastic body in the axial direction of the crankshaft and a cap extension direction perpendicular to an attachment direction in which the crank cap is attached to the engine body.

In the crank cap assembly of the first aspect of the present disclosure, the first elastic body may be rubber. The mass portion may include a protruding portion protruding toward the first elastic body formed in a middle portion in the axial direction of the crankshaft and a cap extension direction perpendicular to an attachment direction in which the crank cap is attached to the engine body.

In the crank cap assembly of the first aspect of the present disclosure, the elastic supporter may further include a second elastic body disposed between the mass portion and a head of the attachment bolt.

In the crank cap assembly of the first aspect of the present disclosure, the first elastic body and the second elastic body may be rubber and the second elastic body may be higher in hardness than the first elastic body.

In the crank cap assembly of the first aspect of the present disclosure, the elastic supporter may include at least two attachment bolts, and a collar disposed between the second elastic body and the head of the attachment bolts. The collar may be disposed such that the at least two attachment bolts penetrate the collar.

In the crank cap assembly of the first aspect of the present disclosure, the elastic supporter may further include a third elastic body. The third elastic body may be rubber disposed between the attachment bolt and an inner surface of the through hole.

In the crank cap assembly of the first aspect of the present disclosure, the first elastic body, the second elastic body, and the third elastic body may be rubber and a single member.

In the crank cap assembly of the first aspect of the present disclosure, the elastic supporter may further include a fourth elastic body disposed between a head of the cap bolt and the mass portion.

In the crank cap assembly of the first aspect of the present disclosure, the mass portion may include a recessed portion. The head of the attachment bolt may be received in the recessed portion at least in part.

In the crank cap assembly of the first aspect of the present disclosure, the mass portion may include a body portion and two extending portions extending in parallel toward an outside from the body portion. The crank cap may be disposed such that a part of the crank cap is received between the two extending portions.

In the crank cap assembly of the first aspect of the present disclosure, the elastic supporter may include a fifth elastic body disposed between the extending portion and the crank cap.

In the crank cap assembly of the first aspect of the present disclosure, the mass portion may include a plurality of partial mass portions divided in the attachment direction in which the crank cap is attached to the engine body. The partial mass portions may be configured to be supported with respect to the crank cap at spring constants different from each other in the axial direction of the crankshaft.

In the crank cap assembly of the first aspect of the present disclosure, the mass portion may include a plurality of partial mass portions divided in the axial direction of the crankshaft and the cap extension direction perpendicular to the attachment direction in which the crank cap is attached to the engine body. At least one of the partial mass portions may be configured to be supported with respect to the crank cap at a spring constant different from a spring constant of a rest of the partial mass portions in the axial direction of the crankshaft.

In the crank cap assembly of the first aspect of the present disclosure, a sixth elastic body may be provided between the partial mass portions next to each other.

In the crank cap assembly of the first aspect of the present disclosure, the elastic supporter may be configured so as to elastically support the mass portion at a different spring constant in three directions. The three directions are the axial direction of the crankshaft, the attachment direction in which the crank cap is attached to the engine body, and the cap extension direction perpendicular to both the axial direction and the attachment direction.

In the crank cap assembly of the first aspect of the present disclosure, the elastic supporter may be formed such that the spring constant increases in an order of the axial direction, the cap extension direction, and the attachment direction.

A second aspect of the present disclosure relates to an internal combustion engine that includes a plurality of the crank cap assemblies according to the first aspect of the present disclosure, and a structural body provided in the internal combustion engine below the crankshaft. In the internal combustion engine, the crankshaft is rotatably provided in the engine body by the crank cap assemblies disposed in a row. A seventh elastic body is provided between the mass portion of the crank cap assembly and the structural body. The mass portion is elastically supported on the structural body by the seventh elastic body.

A third aspect of the present disclosure relates to an internal combustion engine that includes a plurality of the crank cap assemblies according to the first aspect of the present disclosure. In the internal combustion engine, the crankshaft is rotatably attached to the engine body by the crank cap assemblies disposed in a row. The crank cap assembly disposed in a middle portion of the engine body in the axial direction of the crankshaft is configured such that a resonance frequency of the mass portion of the crank cap assembly is higher than resonance frequencies of the mass portions of the crank cap assemblies disposed in both end portions of the engine body in the axial direction of the crankshaft.

According to the aspects of the present disclosure, a crank cap assembly is provided that is capable of suppressing front-rear bending vibration occurring in a crank cap.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
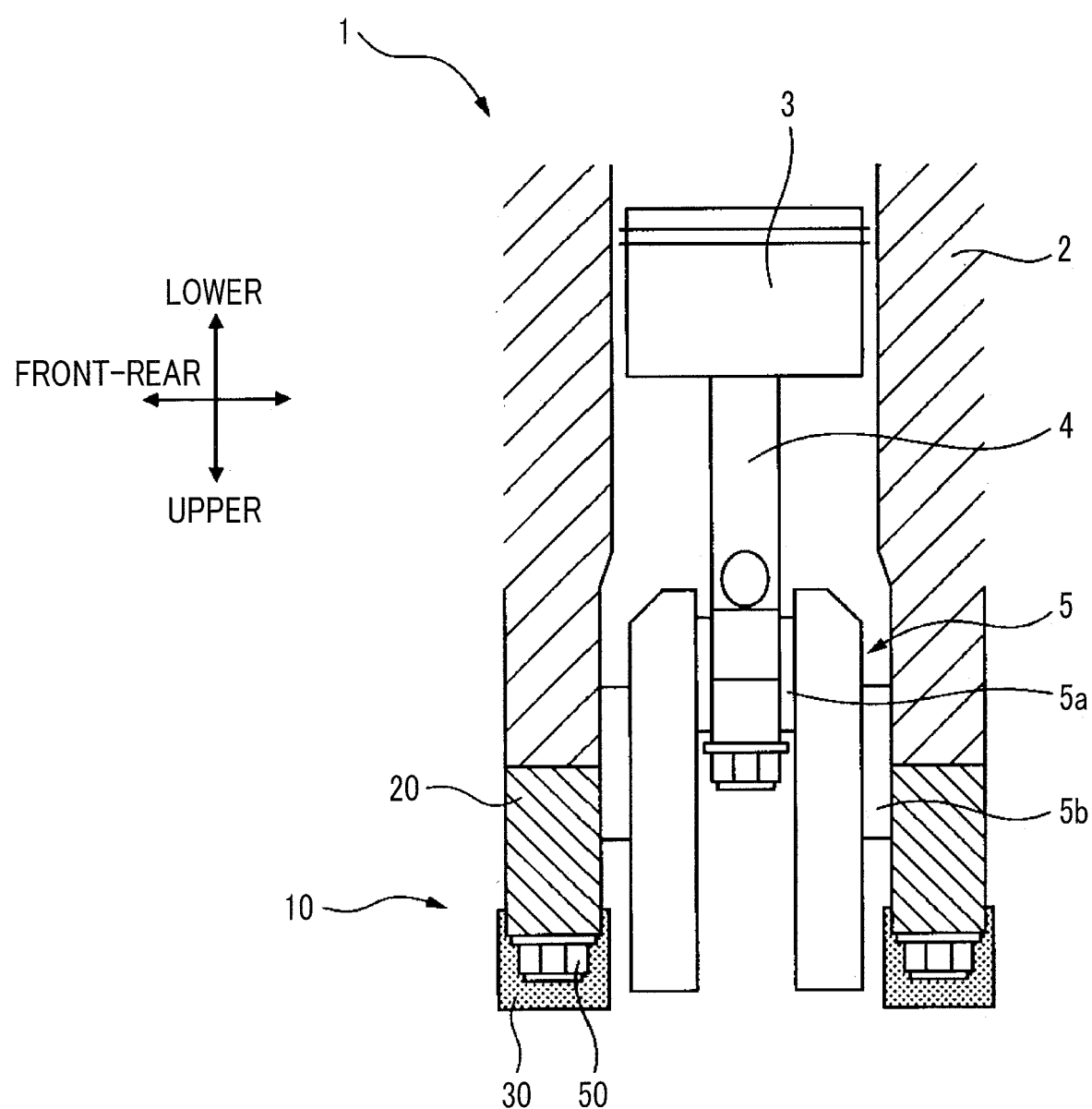
FIG. 1 is a schematic side sectional view of an internal combustion engine provided with a crank cap assembly.

Hereinafter, embodiments of the present disclosure will be described in detail with reference to accompanying drawings. In the following description, the same reference numerals are attached to similar components.

First Embodiment

Description of Internal Combustion Engine

FIG. 1 is a schematic side sectional view of an internal combustion engine provided with a crank cap assembly according to the present embodiment. As illustrated in FIG. 1, an internal combustion engine 1 is provided with a cylinder block 2, a piston 3, a connecting rod 4, a crankshaft 5, and a crank cap assembly 10. The piston 3 reciprocates up and down in the cylinder that is formed in the cylinder block 2. One end of the connecting rod 4 is connected to the piston 3 by a piston pin (not illustrated), and the other end of the connecting rod 4 is connected to the crankshaft 5 by a crank pin 5a. The connecting rod 4 acts to convert the reciprocating motion of the piston 3 into rotational motion of the crankshaft 5.

The crankshaft 5 is provided with a plurality of crank journals 5b. The crank journal is rotatably supported by a bearing. The bearing is formed by a semicircular recessed portion formed in the lower portion of the cylinder block 2 and a semicircular recessed portion (recessed portion 21 to be described later) formed in the crank cap assembly 10.

Figure 2:
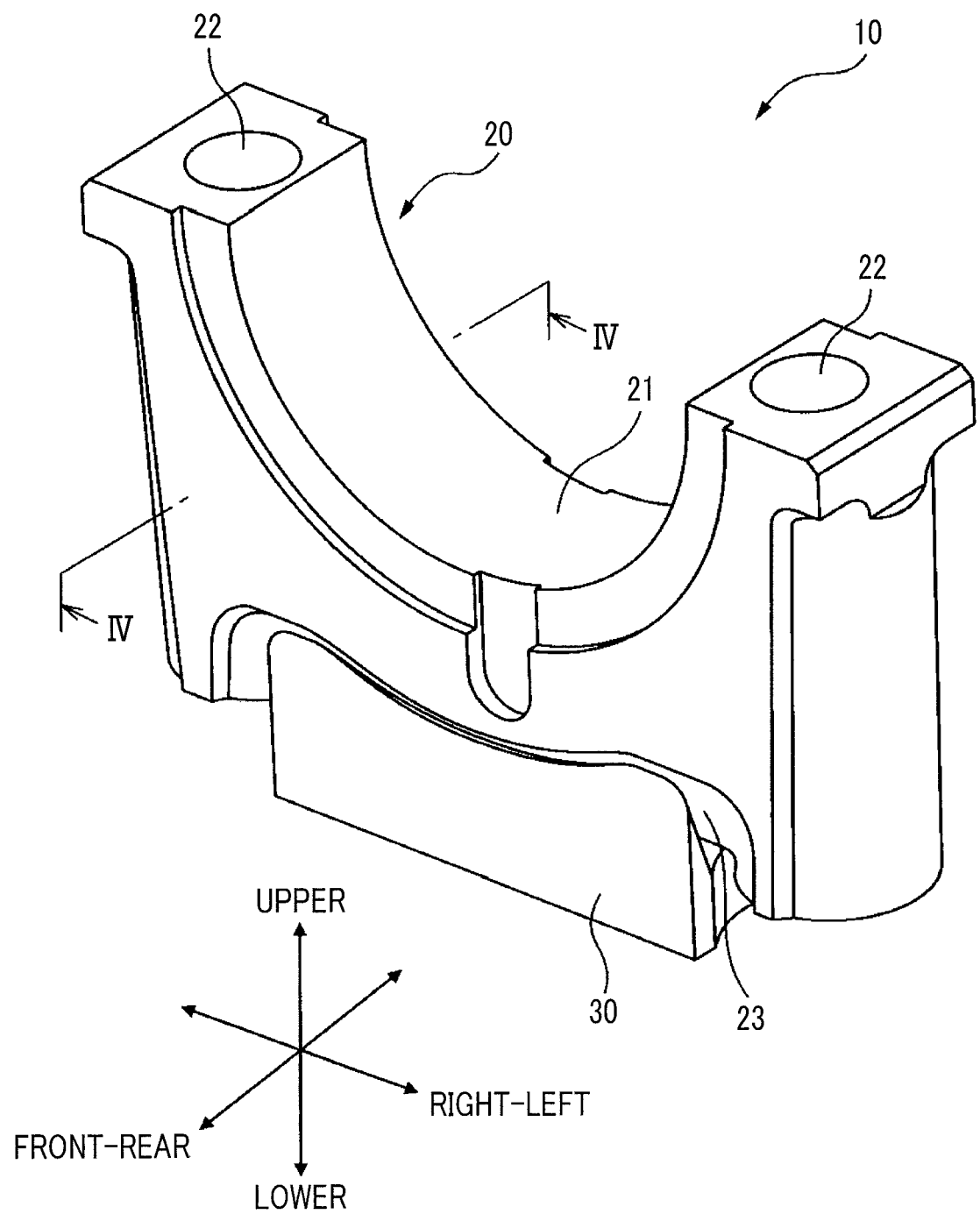
FIG. 2 is a perspective view schematically illustrating the crank cap assembly in an assembled state.
Figure 3:
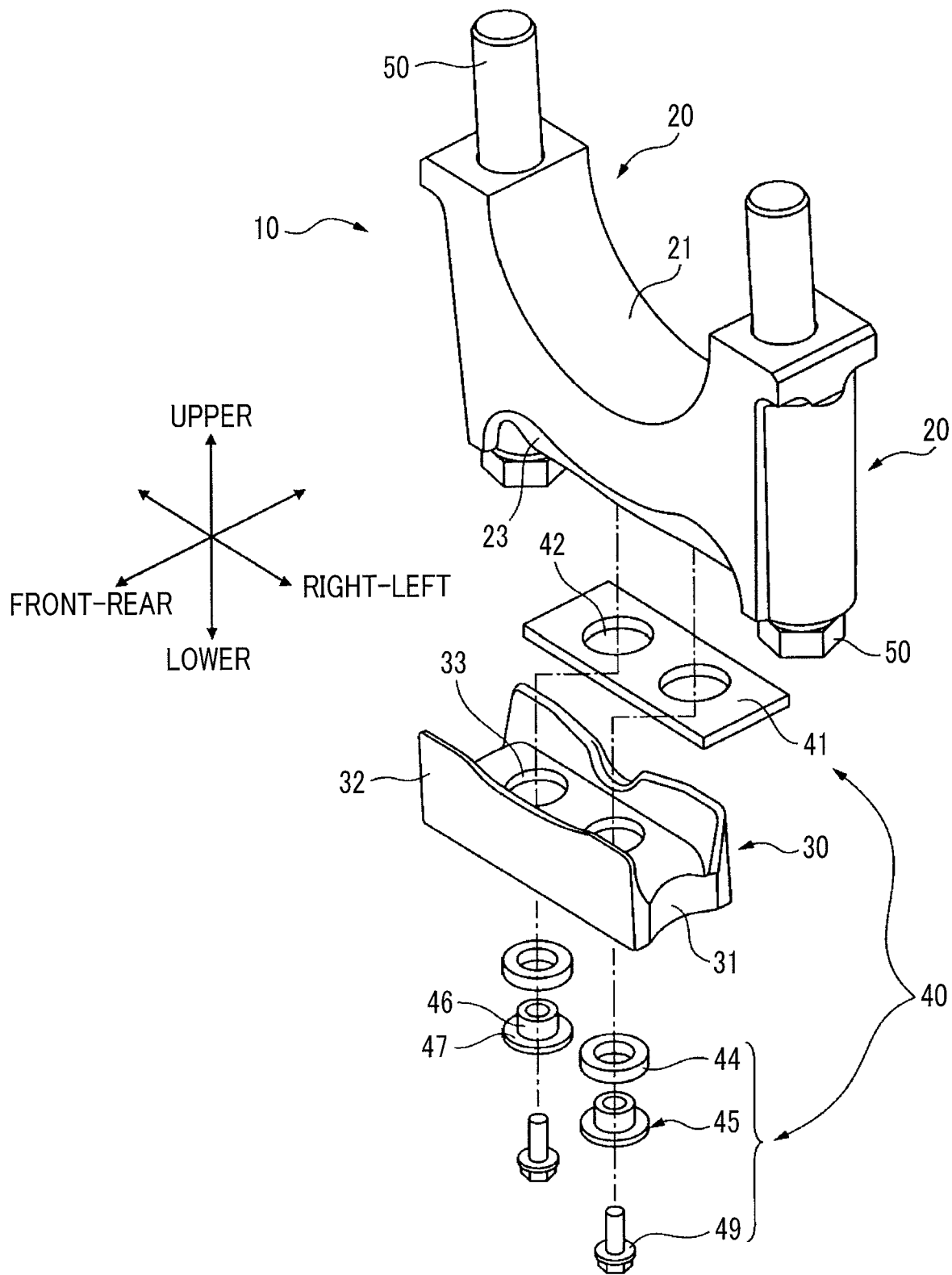
FIG. 3 is a perspective view schematically illustrating the crank cap assembly in a disassembled state.
Figure 4:
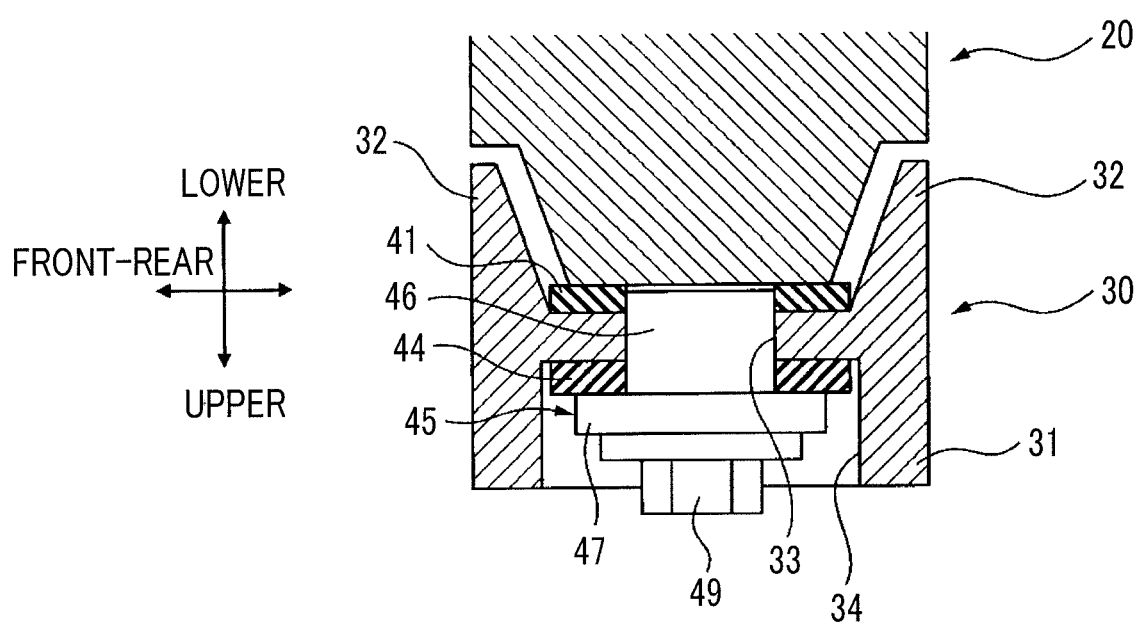
FIG. 4 is a partial sectional view of the crank cap assembly viewed along line IV-IV of FIG. 2.

FIG. 2 is a perspective view schematically illustrating the crank cap assembly in an assembled state. FIG. 3 is a perspective view schematically illustrating the crank cap assembly in a disassembled state. FIG. 4 is a partial sectional view of the crank cap assembly viewed along line IV-IV of FIG. 2.

As illustrated in FIGS. 1 to 4, in the present specification, the axial direction of the crankshaft 5 will be referred to as the "front-rear direction" and the attachment direction in which a crank cap 20 of the crank cap assembly 10 is attached to the cylinder block 2 will be referred to as the "upper-lower direction" for convenience. Especially, relatively in the "upper-lower direction", the side where the cylinder block 2 is positioned will be referred to as the upper side and the side where the crank cap assembly 10 is positioned will be referred to as the lower side. The direction that is perpendicular to the "front-rear direction" and the "upper-lower direction" will be referred to as the "right-left direction". None of the "front-rear direction", the "upper-lower direction", and the "right-left direction" specifies the direction in which the internal combustion engine is installed. Accordingly, the "front-rear direction" may mean, for example, the vertical direction of a vehicle depending on how the internal combustion engine is installed with respect to the vehicle.

Configuration of Crank Cap Assembly

As illustrated in FIGS. 1 to 3, the crank cap assembly 10 is provided with the crank cap 20, a mass portion 30, an elastic supporter 40, and two cap bolts 50.

The crank cap 20 is metallic and attached to the cylinder block 2 in a state where the crank cap 20 extends in the right-left direction. Accordingly, it can be said that the right-left direction is the extension direction of the crank cap. The crank cap 20 is provided with the semicircular recessed portion 21 for supporting the crank journal 5b of the crankshaft 5 and a cap through hole 22 for receiving the cap bolt 50.

The recessed portion 21 is formed on the upper side of the crank cap 20 to align with the recessed portion of the cylinder block 2 when the crank cap 20 is attached to the cylinder block 2. The cap through holes 22 are formed in both right and left end portions of the crank cap 20 to extend in the upper-lower direction. The crank cap 20 is formed to have a small thickness (length in the front-rear direction) at a thin part 23 positioned in the lower side thereof. Especially in the present embodiment, the thin part 23 is formed such that the thickness of the thin part 23 decreases toward the lower side of the crank cap 20 (end portion side where the mass portion 30 is attached). A bolt hole (not illustrated) for receiving an attachment bolt 49 is formed in the lower surface of the thin part 23.

Figure 5A:
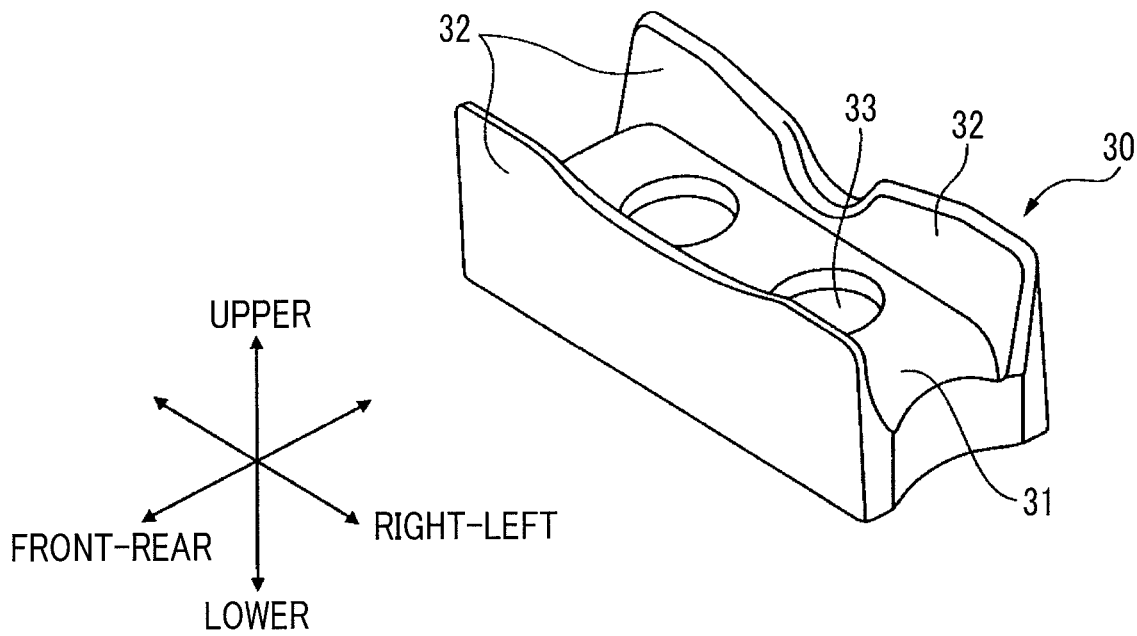
FIG. 5A is a perspective view schematically illustrating a time when a mass portion is viewed from above.
Figure 5B:
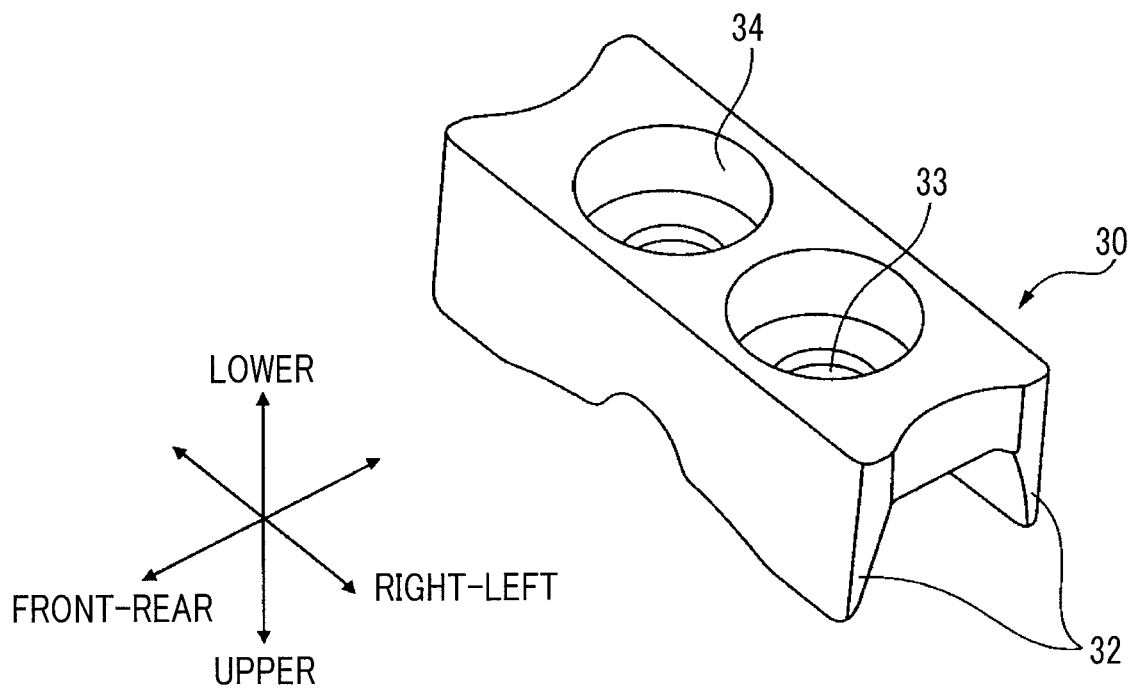
FIG. 5B is a perspective view schematically illustrating a time when the mass portion is viewed from below.

FIGS. 5A and 5B are perspective views schematically illustrating the mass portion 30. FIG. 5A is a diagram in which the mass portion 30 is viewed from above, and FIG. 5B is a diagram in which the mass portion is viewed from below. The mass portion 30 is metallic. As illustrated in FIGS. 3 to 5A and 5B, the mass portion 30 is provided with a body portion 31 formed in an almost rectangular parallelepiped shape, two extending portions 32 extending in parallel toward the outside from the body portion 31, a body through hole 33 penetrating the body portion 31, and a recessed portion 34 for a head.

The extending portions 32 are disposed to protrude upwards from both ends of the body portion 31 in the front-rear direction. The mass portion 30 is disposed such that a part of the crank cap 20, the thin part 23 in particular, is received between the two extending portions 32. Each extending portion 32 is formed complementarily with respect to the outer surface of the thin part 23, such that the gap between the inner surface of each extending portion 32 and the outer surface of the thin part 23 of the crank cap 20 is uniform, with the inner surface of each extending portion 32 and the outer surface of the thin part 23 of the crank cap 20 when the mass portion 30 is disposed as described above. Accordingly, in the present embodiment, each extending portion 32 is formed such that the thickness of each extending portion 32 increases toward the body portion 31.

The extending portion 32 does not necessarily have to be formed complementarily with respect to the outer surface of the thin part 23. The mass portion 30 does not necessarily have to have the extending portion 32.

The body through hole 33 is formed to penetrate the inside of the mass portion 30 in the upper-lower direction. In other words, the body through hole 33 extends in the direction in which the extending portion 32 protrudes from the body portion 31 between the two extending portions 32. The body through hole 33 is formed to have a circular section larger in diameter than the attachment bolt 49 such that the attachment bolt 49 penetrates the body through hole 33. As illustrated in FIGS. 3, 5A, and 5B, in the present embodiment, two body through holes 33 separated from each other in the right-left direction are formed in the mass portion 30.

The recessed portion 34 for a head is formed in the lower side surface of the mass portion 30, that is, the side surface on the side that is opposite to the side surface which faces the crank cap 20 when the mass portion 30 is attached to the crank cap 20. Especially, the recessed portion 34 for a head is formed around the lower side end portion of each body through hole 33, formed coaxially with the body through hole 33, and formed to have a circular section larger in diameter than the body through hole 33.

The elastic supporter 40 elastically supports the mass portion 30 with respect to the crank cap 20 between the two cap bolts 50. Especially, the elastic supporter 40 elastically supports each mass portion 30 independently with respect to each crank cap 20. In the present embodiment, the elastic supporter 40 elastically supports the mass portion 30 in the front-rear direction, the right-left direction, and the upper-lower direction. The elastic supporter 40 is provided with a first elastic body 41, a second elastic body 44, a collar 45, and the attachment bolt 49.

The first elastic body 41 is rubber formed in a flat plate shape. Preferably, the rubber used for the first elastic body 41 is oil-resistant and heat-resistant rubber such as fluororubber. Alternatively, the rubber used for the first elastic body 41 may be rubber with a large damping effect such as butyl rubber. In most cases, the oil resistance of such rubber is low. Accordingly, although not particularly limited, it is desirable in a case where such rubber is used is a configuration in which an oil seal structure is provided around the rubber such that the rubber does not directly touch a lubricant in the internal combustion engine.

The first elastic body 41 is disposed to be sandwiched between the crank cap 20 and the mass portion 30. The first elastic body 41 is provided with a first through hole 42 penetrating rubber formed in a flat plate shape. The first through hole 42 is disposed to align with the bolt hole formed in the crank cap 20 and the body through hole 33 formed in the mass portion 30. In the present embodiment, two first through holes 42 are formed in the first elastic body 41.

The second elastic body 44 is rubber formed in a ring shape. The second elastic body 44 is formed of rubber similar to the rubber of the first elastic body 41. The second elastic body 44 may be identical to or different from the first elastic body 41 in terms of material and configuration. In the present embodiment, the crank cap assembly 10 has two second elastic bodies 44 and each second elastic body 44 is disposed in the recessed portion 34 for a head formed in the mass portion 30.

The collar 45 is disposed between the second elastic body 44 and the head of the attachment bolt 49 and is provided with a tubular portion 46 and a flange portion 47. The tubular portion 46 is formed in a cylindrical shape and is formed such that the outer diameter of the tubular portion 46 is smaller than the inner diameter of the body through hole 33 of the mass portion 30, the inner diameter of the first through hole 42 of the first elastic body 41, and the inner diameter of the second elastic body 44. The tubular portion 46 is formed such that the length of the tubular portion 46 in the axial direction is smaller than the thickness that is obtained as the sum of the thickness of the first elastic body 41 (length in the upper-lower direction), the thickness of the mass portion 30 in the region where the recessed portion 34 for a head is formed (length in the upper-lower direction), and the thickness of the second elastic body 44 (length in the upper-lower direction).

The flange portion 47 is disposed at one end of the tubular portion 46. The flange portion 47 is formed to extend in a circumferential direction from the outer surface of the tubular portion 46. The flange portion 47 is formed such that the outer diameter of the flange portion 47 is smaller than the inner diameter of the recessed portion 34 for a head.

The collar 45 is disposed such that the tubular portion 46 extends through the body through hole 33 of the mass portion 30, the first through hole 42 of the first elastic body 41, and the second elastic body 44 and the flange portion 47 is positioned on the lower surface of the second elastic body 44.

The attachment bolt 49 is used for attachment of the mass portion 30 to the crank cap 20. The attachment bolt 49 attaches the mass portion 30 to the crank cap 20 between the two cap bolts 50. Although the crank cap assembly 10 is provided with two attachment bolts 49 in the present embodiment, the crank cap assembly 10 may be provided with three or more attachment bolts 49 or may be provided with one attachment bolt 49 instead.

The two cap bolts 50 fix the crank cap 20 to an engine body, to the cylinder block 2 to be specific. The cap bolts 50 are disposed to extend in the upper-lower direction in both end portions of the crank cap 20 in the right-left direction.

As illustrated in FIG. 3, in the crank cap assembly 10, the first elastic body 41 is disposed between the lower surface of the crank cap 20 and the upper surface of the mass portion 30. The second elastic body 44 and the collar 45 are disposed in the recessed portion 34 for a head that is formed in the side surface of the mass portion 30 which is on the side opposite to the crank cap 20 side. The second elastic body 44 is disposed between the mass portion 30 and the collar 45. Accordingly, the second elastic body 44 is disposed between the mass portion 30 and the head of the attachment bolt 49. The head of the attachment bolt 49 is received, at least in part, in the recessed portion 34 for a head.

The first elastic body 41, the mass portion 30, the second elastic body 44, and the collar 45 are attached to the crank cap 20 by the attachment bolt 49 in a state where the first elastic body 41, the mass portion 30, the second elastic body 44, and the collar 45 are disposed as described above. The attachment bolt 49 extends through the opening portion in the tubular portion 46 of the collar 45, the opening portion of the second elastic body 44, the body through hole 33 of the mass portion 30, and the first through hole 42 of the first elastic body 41 and is fastened to the bolt hole formed in the crank cap 20. Accordingly, the attachment bolt 49 attaches the mass portion 30 to the crank cap 20 in a state where the first elastic body 41 is sandwiched between the mass portion 30 and the crank cap 20. The mass portion 30 is attached to the crank cap 20 in a state where the second elastic body 44 is sandwiched between the head of the attachment bolt 49 and the mass portion 30.

Resonance Occurring in Crank Cap

Figure 6A:
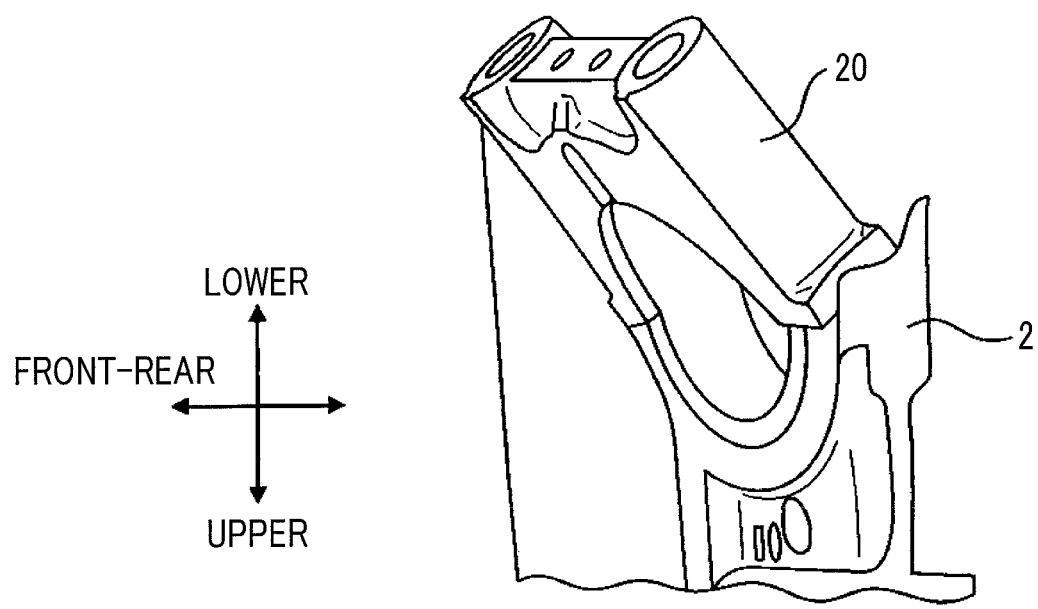
FIG. 6A is a diagram schematically illustrating a vibration mode of pivoting resonance occurring at a relatively low frequency in a case where the mass portion is not disposed.
Figure 6B:
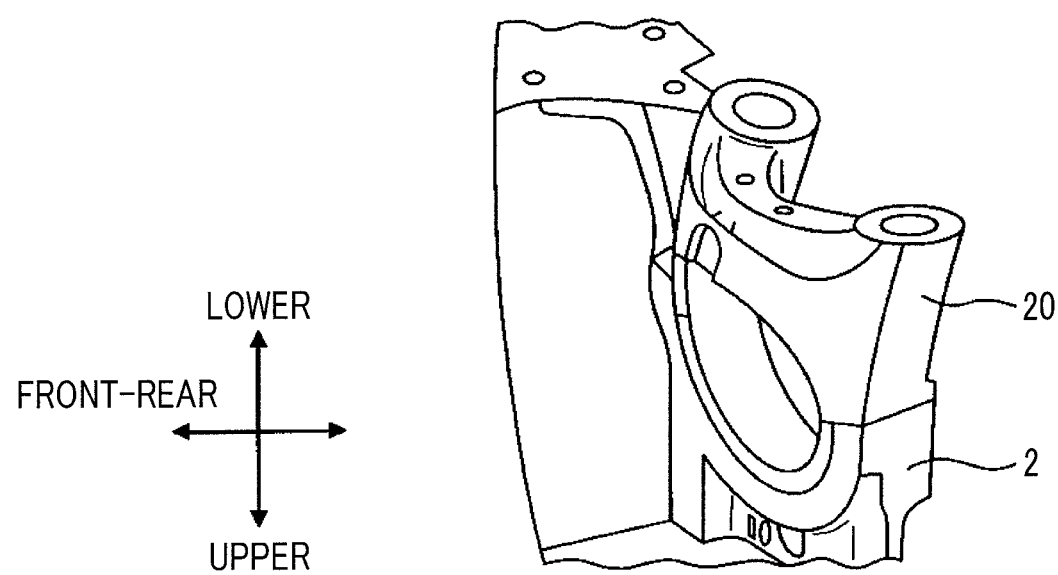
FIG. 6B is a diagram schematically illustrating a vibration mode of front-rear bending resonance occurring at a relatively high frequency in a case where the mass portion is not disposed.

The resonant vibration that occurs in the crank cap 20 during an operation of the internal combustion engine 1 will be described below. FIGS. 6A and 6B are diagrams schematically illustrating the vibration modes of the resonant vibration of the crank cap 20 in a state where the mass portion 30 is not disposed. FIGS. 6A and 6B are perspective views in which the crank cap 20 is viewed from below. The vibration that is illustrated in FIGS. 6A and 6B is larger than the actual resonant vibration, and this illustration is for easier understanding of the vibration modes.

FIG. 6A is a diagram schematically illustrating the vibration mode of pivoting resonance occurring at a relatively low frequency. As illustrated in FIG. 6A, in the pivoting resonance, the crank cap 20 vibrates to pivot in the front-rear direction around the portion thereof connected to the cylinder block 2.

FIG. 6B is a diagram schematically illustrating the vibration mode of front-rear bending resonance occurring at a relatively high frequency. As illustrated in FIG. 6B, in the front-rear bending resonance, the crank cap 20 vibrates such that the region near the middle of the crank cap 20 in the right-left direction is bent in the front-rear direction. Accordingly, in the front-rear bending resonance, vibration occurs in the front-rear direction in the region near the middle of the crank cap 20 in the right-left direction whereas no vibration occurs in the front-rear direction in the region near both ends.

Although the resonant vibration that occurs in the front-rear direction of the crank cap 20 is illustrated in FIG. 6B, the crank cap 20 undergoes resonant vibration also in the upper-lower direction and the right-left direction. In many cases of the resonant vibration, the resonance frequency increases in the order of the front-rear-direction resonant vibration (pivoting resonance), the right-left-direction resonant vibration, and the front-rear-direction resonant vibration.

Elastic Support of Mass Portion

In the crank cap assembly 10 configured as described above, the mass portion 30 is elastically supported with respect to the crank cap 20 by the elastic supporter 40. Specifically, the mass portion 30 is elastically supported in the upper-lower direction by the elasticity of the first elastic body 41 and the second elastic body 44 in compression and tensile directions. In the front-rear direction and the right-left direction, the mass portion 30 is elastically supported by the shear-direction elasticity of the first elastic body 41 and the second elastic body 44.

The spring constant in the upper-lower direction in which the mass portion 30 is elastically supported in the upper-lower direction with respect to the crank cap 20 changes in accordance with the longitudinal elastic modulus of the first elastic body 41 and the second elastic body 44. The longitudinal elastic modulus of the first elastic body 41 and the second elastic body 44 changes in accordance with the material of the elastic bodies 41, 44 and the tightening force of the attachment bolt 49. Accordingly, the spring constant in the upper-lower direction changes in accordance with, for example, the material of the elastic bodies 41, 44 and the tightening force of the attachment bolt 49.

The spring constants in the front-rear direction and the right-left direction in which the mass portion 30 is elastically supported in the front-rear direction and the right-left direction with respect to the crank cap 20 change in accordance with the transverse elastic modulus and the sectional shape (shear stress distribution depending on the sectional shape) of the first elastic body 41 and the second elastic body 44. As is the case with the transverse elastic modulus of the first elastic body 41 and the second elastic body 44 changes in accordance with the material of the elastic bodies 41, 44 and the tightening force of the attachment bolt 49. Accordingly, the spring constants in the front-rear direction and the right-left direction change in accordance with, for example, the material and the sectional shape of the elastic bodies 41, 44 and the tightening force of the attachment bolt 49.

In the present embodiment, the elastic supporter 40 is configured such that the spring constant in the upper-lower direction, the spring constant in the front-rear direction, and the spring constant in the right-left direction are values different from one another. Especially, although not particularly limited, it is desirable that the crank cap assembly 10 according to the present embodiment is formed such that the spring constant increases in the order of the spring constant in the front-rear direction, the spring constant in the right-left direction, and the spring constant in the upper-lower direction.

Specifically, the spring constant in the front-rear direction is set such that the resonance frequency in the front-rear direction of the mass portion 30 is almost equal to the resonance frequency in the resonant vibration (pivoting resonance) in the front-rear direction of the crank cap 20. The spring constant in the right-left direction is configured such that the resonance frequency in the right-left direction of the mass portion 30 is almost equal to the resonance frequency in the resonant vibration in the right-left direction of the crank cap 20. The spring constant in the upper-lower direction is configured such that the resonance frequency in the upper-lower direction of the mass portion 30 is almost equal to the resonance frequency in the resonant vibration in the upper-lower direction of the crank cap 20.

Action and Effect

In the crank cap assembly 10 according to the present embodiment, the mass portion 30 is elastically supported in the front-rear direction with respect to the crank cap 20 by the elastic supporter 40. As a result, the resonant vibration (pivoting resonance) in the front-rear direction that occurs in the crank cap 20 can be reduced. Especially, in the present embodiment, the spring constant in the front-rear direction of the elastic supporter 40 is set such that the resonance frequency in the front-rear direction of the mass portion 30 is almost equal to the resonance frequency in the resonant vibration (pivoting resonance) in the front-rear direction of the crank cap 20. As a result, the resonant vibration in the front-rear direction that occurs in the crank cap 20 can be effectively reduced.

As described above, in the front-rear bending resonance, the crank cap 20 vibrates such that the region near the middle of the crank cap 20 in the right-left direction is bent in the front-rear direction. In the crank cap assembly 10 according to the present embodiment, the mass portion 30 is elastically supported by the elastic supporter 40 with respect to the right-left-direction middle part of the crank cap 20. Accordingly, the mass portion 30 is attached to the crank cap 20 in the region where vibration occurs in the front-rear bending resonance. Therefore, according to the present embodiment, vibration attributable to the front-rear bending resonance occurring in the crank cap 20 can also be reduced.

The crank cap 20 undergoes resonant vibration also in the right-left direction and the upper-lower direction as described above, and the resonance frequencies in the right-left direction and the upper-lower direction differ from each other and differ from the resonance frequency in the front-rear direction. In the present embodiment, values different from one another can be set as the spring constants in the front-rear direction, the spring constants in the right-left direction, and the spring constants in the upper-lower direction of the elastic supporter 40. Accordingly, the resonant vibration in the right-left direction and the upper-lower direction occurring in the crank cap 20 as well as the resonant vibration in the front-rear direction occurring in the crank cap 20, can be reduced.

Especially, in the present embodiment, the spring constant in the right-left direction of the elastic supporter 40 is set such that the resonance frequency in the right-left direction of the mass portion 30 is almost equal to the resonance frequency of the vibration in the right-left direction of the crank cap 20. Likewise, the spring constant in the upper-lower direction of the elastic supporter 40 is set such that the resonance frequency in the upper-lower direction of the mass portion 30 is almost equal to the resonance frequency of the vibration in the upper-lower direction of the crank cap 20. As a result, the resonant vibration in the right-left direction and the upper-lower direction occurring in the crank cap 20 can be effectively reduced.

Figure 7:
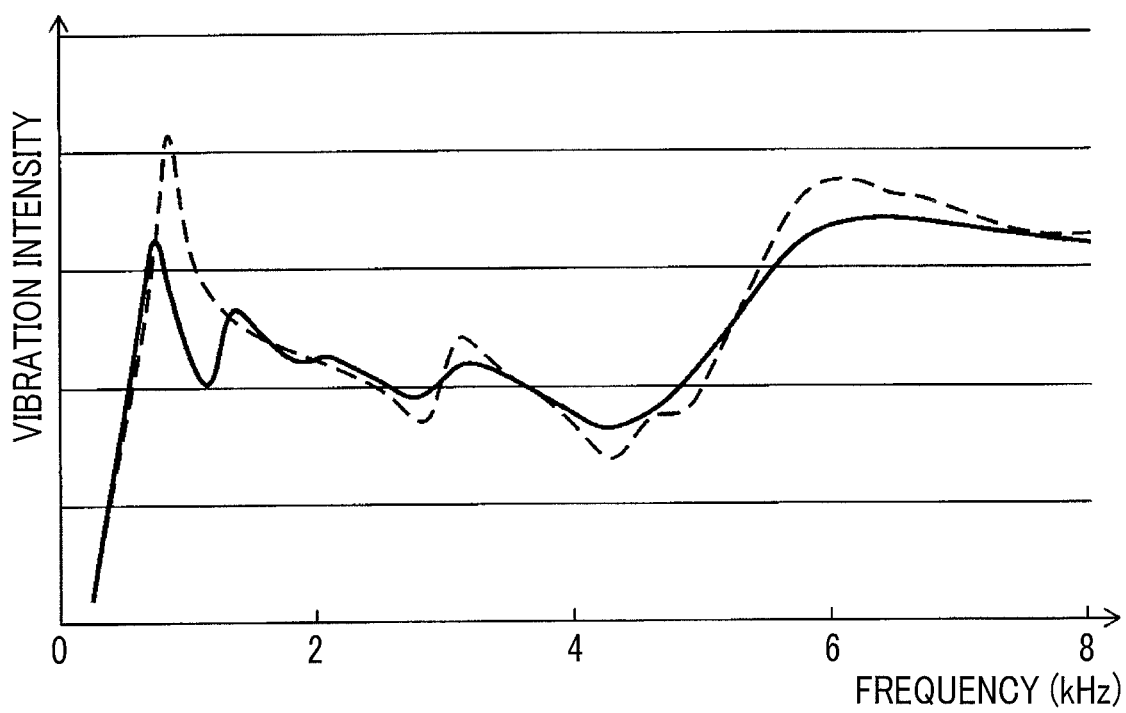
FIG. 7 is a graph illustrating vibration intensity by frequency obtained by computer aided engineering (CAE) analysis.

FIG. 7 is a graph illustrating vibration intensity by frequency obtained by CAE analysis. The dashed line in the drawing indicates the result of the analysis in a case where the mass portion 30 and the elastic supporter 40 are not disposed, and the solid line in the drawing indicates the result of the analysis in a case where the mass portion 30 and the elastic supporter 40 are disposed.

As the resonant vibration (pivoting resonance) in the front-rear direction and the resonant vibration in the upper-lower and right-left directions occurring in the crank cap 20 mainly occur at 1 to 2 kHz, it can be seen from FIG. 7 that the resonant vibration in the frequency region is reduced. As the front-rear bending resonance occurring in the crank cap 20 mainly occurs at around 6 kHz, it can be seen from FIG. 7 that the resonant vibration in the frequency region is reduced.

In the above embodiment, the elastic supporter 40 has two elastic bodies, one being the first elastic body 41 and the other being the second elastic body 44. However, the elastic supporter 40 may also have merely one elastic body in the elastic supporter 40. Still, the mass portion 30 does not vibrate in the upper-lower direction in this case, and thus the effect of resonant vibration reduction in the upper-lower direction of the crank cap 20 is reduced.

In the above embodiment, both the first elastic body 41 and the second elastic body 44 are formed of rubber. However, the elastic bodies 41, 44 do not necessarily have to be formed of rubber. The elastic bodies 41, 44 need to be formed as non-rubber elastic bodies such as disc springs. Even in a case where a non-rubber elastic body is used, the elastic supporter 40 needs to elastically support the mass portion 30 in the front-rear direction.

In the above embodiment, the first elastic body 41 and the second elastic body 44 are formed of the same rubber. Accordingly, the first elastic body 41 and the second elastic body 44 have the same hardness. However, the hardness of the first elastic body 41 and the hardness of the second elastic body do not necessarily have to be equal to each other.

Accordingly, the elastic supporter 40 may be formed such that, for example, the hardness of the second elastic body 44 is higher than the hardness of the first elastic body 41. The weight of the mass portion 30 is added to the second elastic body 44 whereas the weight of the mass portion 30 is not added to the first elastic body 41. Accordingly, the second elastic body 44 is more likely to cause creep deformation than the first elastic body 41. By the hardness of the second elastic body 44 being higher than the hardness of the first elastic body 41, creep deformation of the second elastic body 44 can be kept small.

Nowadays, various mechanisms are disposed in compact internal combustion engines, leading to less and less empty spaces in the internal combustion engines. Meanwhile, the mass portion 30 according to the present embodiment has the extending portion 32, and thus a part of the mass portion 30 is positioned on both sides of the crank cap 20. Accordingly, in the present embodiment, the mass portion 30 that has as large mass as possible in a small space can be disposed.

The mass portion 30 according to the present embodiment has the recessed portion 34 for a head, and the head of the attachment bolt 49 is received in the recessed portion 34 for a head of the mass portion 30. According to the present embodiment, the mass portion 30 that has as large mass as possible in a small space can be disposed also by the mass portion 30 being formed such that a part of the mass portion 30 is positioned also in the space around the attachment bolt 49 as described above.

Modification Examples of First Embodiment

Figure 8:
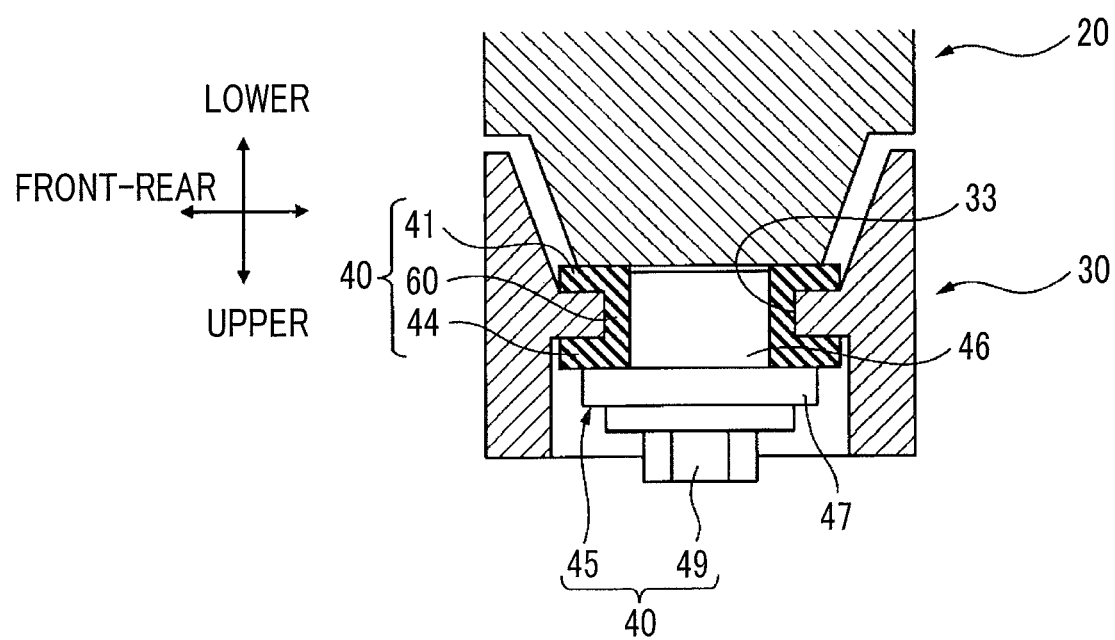
FIG. 8 is a sectional view illustrating the crank cap assembly according to a first modification example of a first embodiment.
Figure 9:
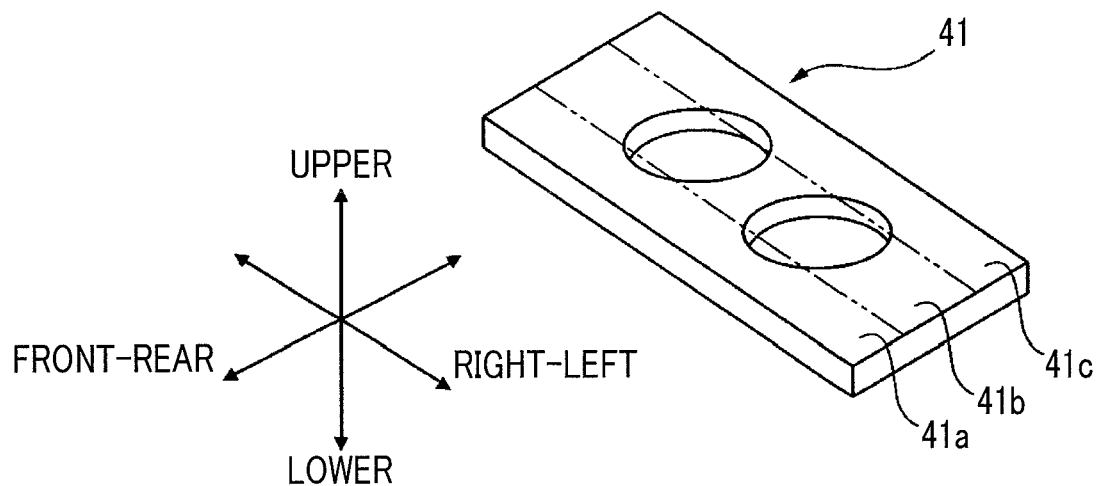
FIG. 9 is a perspective view illustrating a first elastic body according to a second modification example of the first embodiment.
Figure 10:
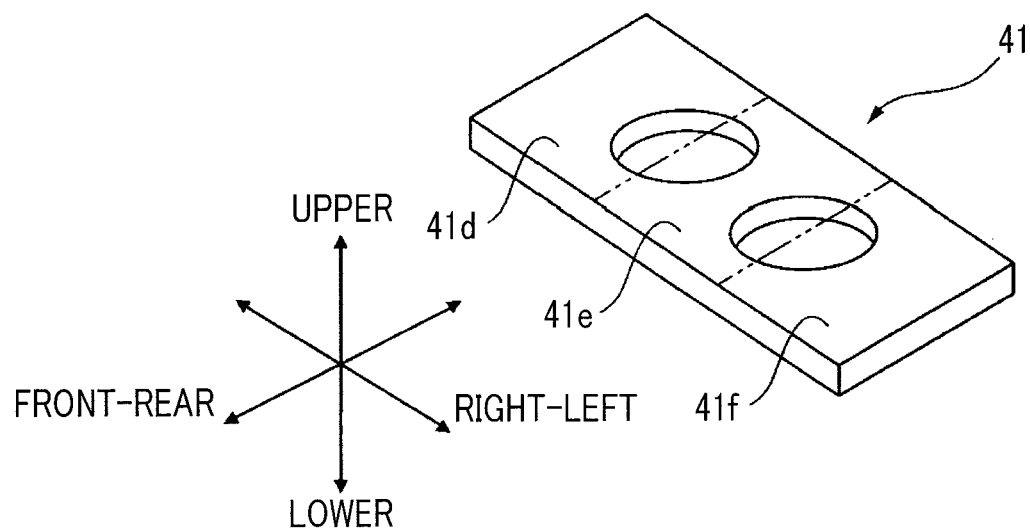
FIG. 10 is a perspective view illustrating the first elastic body according to a third modification example of the first embodiment.
Figure 11:
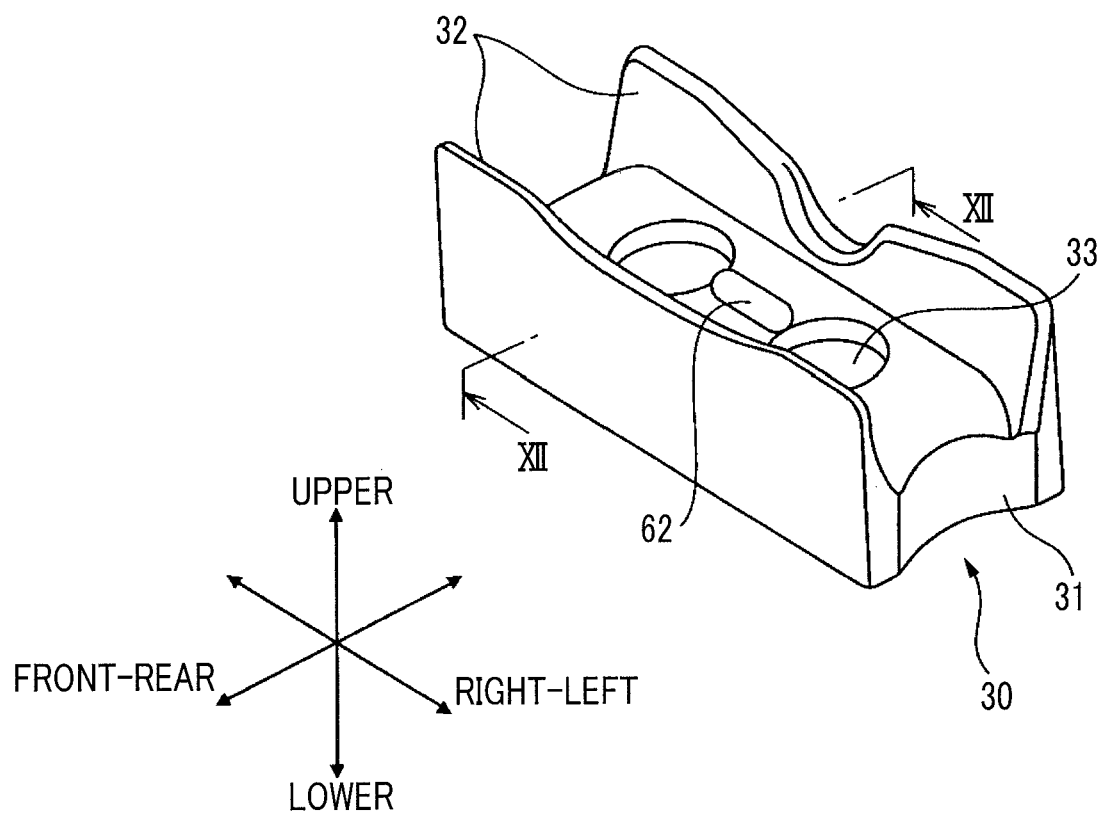
FIG. 11 is a perspective view illustrating the mass portion according to a fourth modification example of the first embodiment.
Figure 12:
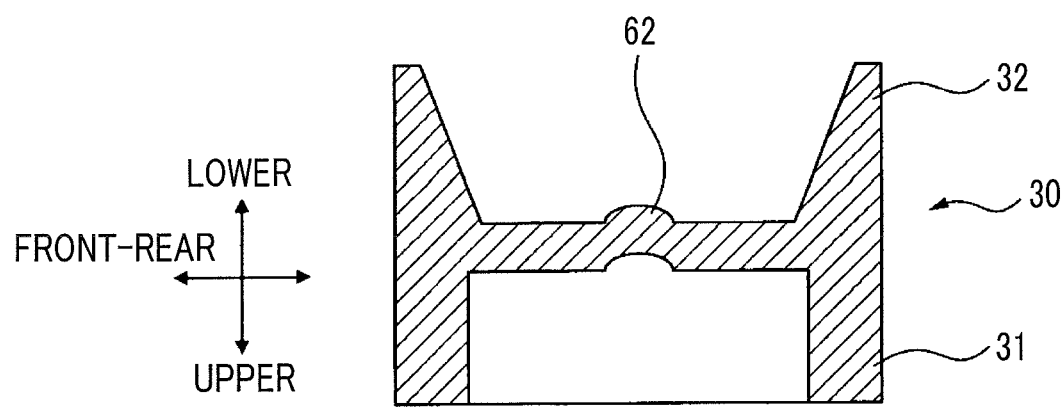
FIG. 12 is a sectional side view illustrating the mass portion viewed from line XII-XII of FIG. 11.

The crank cap assembly 10 according to modification examples of the first embodiment will be described below with reference to FIGS. 8 to 12. FIG. 8 is a sectional view illustrating the crank cap assembly 10 according to a first modification example of the first embodiment. FIG. 9 is a perspective view illustrating the first elastic body 41 according to a second modification example of the first embodiment. FIG. 10 is a perspective view illustrating the first elastic body 41 according to a third modification example of the first embodiment. FIG. 11 is a perspective view illustrating the mass portion 30 according to a fourth modification example of the first embodiment. FIG. 12 is a sectional side view illustrating the mass portion 30 viewed from line XII-XII of FIG. 11.

As illustrated in FIG. 8, in the crank cap assembly 10 according to the first modification example of the first embodiment, the elastic supporter 40 further includes a third elastic body 60. The third elastic body 60 is formed of rubber similar to the rubber of the first elastic body 41 and the second elastic body 44.

The third elastic body 60 is disposed between the inner surface of the body through hole 33 and the attachment bolt 49 (tubular portion 46 of the collar 45 to be exact) in the body through hole 33 of the mass portion 30. Accordingly, in the body through hole 33, the third elastic body 60 extends in the upper-lower direction in a cylindrical shape around the attachment bolt 49. Especially, the third elastic body 60 extends in the upper-lower direction from the lower surface of the first elastic body 41 to the upper surface of the second elastic body 44. By the third elastic body 60 being disposed between the attachment bolt 49 and the inner surface of the body through hole 33 as described above, the spring constants of the elastic supporter 40 in the front-rear direction and the right-left direction can be adjusted by the third elastic body 60.

In the first modification example of the first embodiment, the first elastic body 41, the second elastic body 44, and the third elastic body 60 are integrally formed. By the elastic bodies 41, 44, 60 being integrally formed as described above, the elastic bodies 41, 44, 60 can be easily attached to the mass portion 30 through single work during manufacturing of the crank cap assembly 10. Accordingly, manufacturing of the crank cap assembly 10 can be simplified.

The third elastic body 60 may also be formed as a body separate from the first elastic body 41 and the second elastic body 44. In this case, the third elastic body 60 may be formed of a material that is different from the material of the first elastic body 41 and the second elastic body 44 and is different in physical properties from the material of the first elastic body 41 and the second elastic body 44.

As illustrated in FIG. 9, in the crank cap assembly 10 according to the second modification example of the first embodiment, the first elastic body 41 is configured as rubber formed such that a middle portion 41*b* is larger in elastic modulus (that is, higher in hardness) than both end portions 41*a*, 41*c* in the front-rear direction. In this case, the first elastic body 41 is formed by, for example, joining of three pieces of rubber having a front-rear-direction length equivalent to one-third of the front-rear-direction length of the first elastic body 41. At this time, the rubber piece that is disposed in the middle in the front-rear direction is lower in elastic modulus than the other rubber pieces.

The elastic modulus of the first elastic body 41 in the front-rear direction may be changed by the component of the rubber being changed in the front-rear direction during manufacturing of the first elastic body 41. In this case, the first elastic body 41 is formed as one piece of rubber.

The vibration of the crank cap 20 in the front-rear direction includes two resonant vibrations, one being resonant vibration in the direction in which the crank cap 20 rolls in the front-rear direction around the portion connected to the cylinder block 2 and the other being resonant vibration in the direction in which the crank cap 20 slides in the front-rear direction. Of the two resonant vibrations, the frequency of the resonant vibration in the roll direction tends to be lower than the frequency of the resonant vibration in the slide direction.

According to the second modification example of the first embodiment, the elastic modulus of the middle portion 41b is larger than the elastic modulus of both end portions 41a, 41c. Accordingly, the resonance frequency in the front-rear roll direction of the mass portion 30 is lower than the resonance frequency in the front-rear slide direction of the mass portion 30. Therefore, the resonant vibration in the front-rear direction occurring in the crank cap 20 can be appropriately reduced.

As illustrated in FIG. 10, in the crank cap assembly 10 according to the third modification example of the first embodiment, the first elastic body 41 is configured as rubber formed such that a middle portion 41e is larger in elastic modulus than both end portions 41d, 41f in the right-left direction. In this case, the first elastic body 41 is formed by, for example, joining of three pieces of rubber having a right-left-direction length equivalent to one-third of the right-left-direction length of the first elastic body 41.

The elastic modulus of the first elastic body 41 in the right-left direction may be changed by the component of the rubber being changed in the right-left direction during manufacturing of the first elastic body 41. In this case, the first elastic body 41 is formed as one piece of rubber.

The vibration of the crank cap 20 in the right-left direction includes two resonant vibrations, one being resonant vibration in the direction in which the crank cap 20 rolls in the right-left direction around the portion connected to the cylinder block 2 and the other being resonant vibration in the direction in which the crank cap 20 slides in the right-left direction. Of the two resonant vibrations, the frequency of the resonant vibration in the roll direction tends to be lower than the frequency of the resonant vibration in the slide direction.

According to the third modification example of the first embodiment, the middle portion 41e is larger in elastic modulus (that is, higher in hardness) than both end portions 41d, 41f. Accordingly, the resonance frequency in the right-left roll direction of the mass portion 30 is lower than the resonance frequency in the right-left slide direction of the mass portion 30. Therefore, the resonant vibration in the right-left direction occurring in the crank cap 20 can be appropriately reduced.

As illustrated in FIGS. 11 and 12, in the crank cap assembly 10 according to the fourth modification example of the first embodiment, the mass portion 30 is provided with a protruding portion 62 protruding upwards, that is, toward the first elastic body 41. The protruding portion 62 is disposed in the middle portion of the mass portion 30 in the right-left direction and the middle portion of the mass portion 30 in the front-rear direction. Especially, in the fourth modification example of the first embodiment, the protruding portion 62 is disposed on the upper surface of the mass portion 30 between the two body through holes 33. As illustrated in FIG. 12, in the fourth modification example of the first embodiment, a recessed portion is formed in the lower surface of the mass portion 30 positioned below the protruding portion 62. However, this recessed portion in the lower surface of the mass portion 30 is optional.

According to the fourth modification example of the first embodiment, the first elastic body 41 disposed on the mass portion 30 is crushed in the region facing the protruding portion 62. Accordingly, the first elastic body 41 has a large elastic modulus in the middle region in the front-rear and right-left directions. Therefore, the resonance frequency in the front-rear roll direction of the mass portion 30 is lower than the resonance frequency in the front-rear slide direction of the mass portion 30. The resonance frequency in the right-left roll direction of the mass portion 30 is lower than the resonance frequency in the right-left slide direction of the mass portion 30. Therefore, the resonant vibration in the front-rear direction and the right-left direction occurring in the crank cap 20 can be appropriately reduced.

Second Embodiment

The crank cap assembly 10 according to a second embodiment will be described below with reference to FIG. 13. Basically, the crank cap assembly according to the second embodiment is similar in configuration to the crank cap assembly according to the first embodiment. Accordingly, the following description will focus on parts of the crank cap assembly according to the second embodiment that differ in configuration from the crank cap assembly according to the first embodiment.

Figure 13:
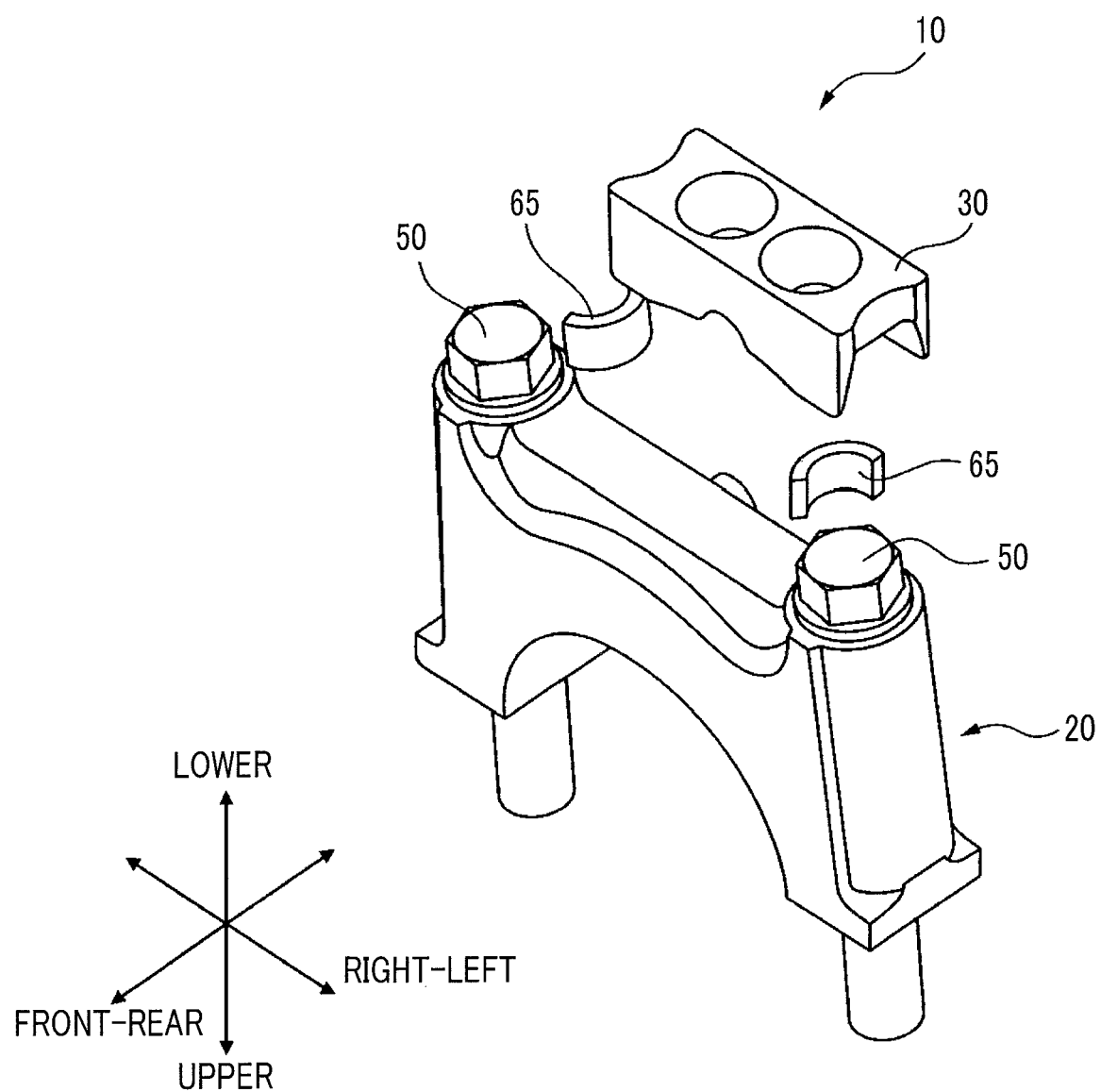
FIG. 13 is an exploded perspective view illustrating the crank cap assembly according to a second embodiment.

FIG. 13 is an exploded perspective view illustrating the crank cap assembly 10 according to the second embodiment. The upper and the lower are reversed in FIG. 13. As is the case with the crank cap assembly 10 according to the first embodiment, the crank cap assembly 10 according to the second embodiment is provided with the elastic supporter 40 that has the first elastic body 41 and the second elastic body 44 although the elastic supporter 40 is not illustrated in FIG. 13. As illustrated in FIG. 13, in the crank cap assembly 10 according to the second embodiment, the elastic supporter 40 is provided with a fourth elastic body 65 made of rubber similar to the rubber of the first elastic body 41 and the second elastic body 44.

The fourth elastic body 65 is disposed between the mass portion 30 and the head of each cap bolt 50. Accordingly, in the right-left direction, the fourth elastic body 65 is disposed inside the head of each cap bolt 50 (on the middle side of the crank cap 20). The fourth elastic body 65 is disposed on both side surfaces of the mass portion 30 in the right-left direction. Especially, in the second embodiment, the fourth elastic body 65 is disposed between the mass portion 30 and the cap bolt 50 in a state where the fourth elastic body 65 touches both the mass portion 30 and the cap bolt 50 when the mass portion 30 is attached to the crank cap 20.

The fourth elastic body 65 disposed as described above elastically supports the mass portion 30 in the right-left direction. As a result, the spring constant in the right-left direction in which the mass portion 30 is elastically supported in the right-left direction changes in accordance with the longitudinal elastic modulus of the fourth elastic body 65 in addition to the transverse elastic modulus of the first elastic body 41 and the second elastic body 44. Accordingly, by the fourth elastic body 65 being used, the spring constant in the right-left direction can be appropriately adjusted without a change in the spring constant in the front-rear direction.

Third Embodiment

The crank cap assembly 10 according to a third embodiment will be described below with reference to FIG. 14.

Basically, the crank cap assembly according to the third embodiment is similar in configuration to the crank cap assembly according to the first and second embodiments. Accordingly, the following description will focus on parts of the crank cap assembly according to the third embodiment that differ in configuration from the crank cap assembly according to the first and second embodiments.

Figure 14:
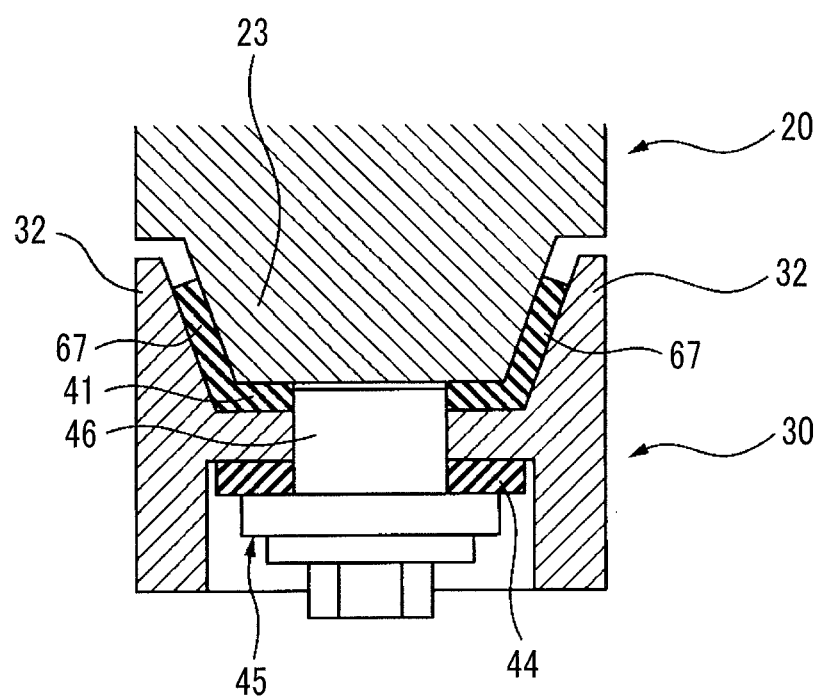
FIG. 14 is a partial sectional view of the crank cap assembly according to a third embodiment, which is similar to FIG. 4.

FIG. 14 is a partial sectional view of the crank cap assembly 10 according to the third embodiment, which is similar to FIG. 4. As illustrated in FIG. 14, the crank cap assembly 10 according to the third embodiment is provided with the elastic supporter 40 that has the first elastic body 41 and the second elastic body 44. As illustrated in FIG. 14, in the crank cap assembly 10 according to the third embodiment, the elastic supporter 40 is provided with a fifth elastic body 67 made of rubber similar to the rubber of the first elastic body 41 and the second elastic body 44.

The fifth elastic body 67 is disposed between the extending portion 32 of the mass portion 30 and (the thin part 23 of) the crank cap 20. In the right-left direction, the fifth elastic body 67 extends over the entire region where the extending portion 32 and the thin part 23 face each other. Especially, in the third embodiment, the fifth elastic body 67 is disposed between the inner surface of the extending portion 32 and the outer surface of the thin part 23 in a state where the fifth elastic body 67 touches both the inner surface of the extending portion 32 and the outer surface of the thin part 23 when the mass portion 30 is attached to the crank cap 20.

The fifth elastic body 67 disposed as described above elastically supports the mass portion 30 in the front-rear direction. As a result, the spring constant in the front-rear direction in which the mass portion 30 is elastically supported in the front-rear direction changes in accordance with the longitudinal elastic modulus of the fifth elastic body 67 in addition to the transverse elastic modulus of the first elastic body 41 and the second elastic body 44. Accordingly, by the fifth elastic body 67 being used, the spring constant in the front-rear direction can be appropriately adjusted without a change in the spring constant in the right-left direction.

Fourth Embodiment

The crank cap assembly 10 according to a fourth embodiment will be described below with reference to FIGS. 15 and 16. Basically, the crank cap assembly according to the fourth embodiment is similar in configuration to the crank cap assembly according to the first to third embodiments. Accordingly, the following description will focus on parts of the crank cap assembly according to the fourth embodiment that differ in configuration from the crank cap assembly according to the first to third embodiments.

Figure 15:
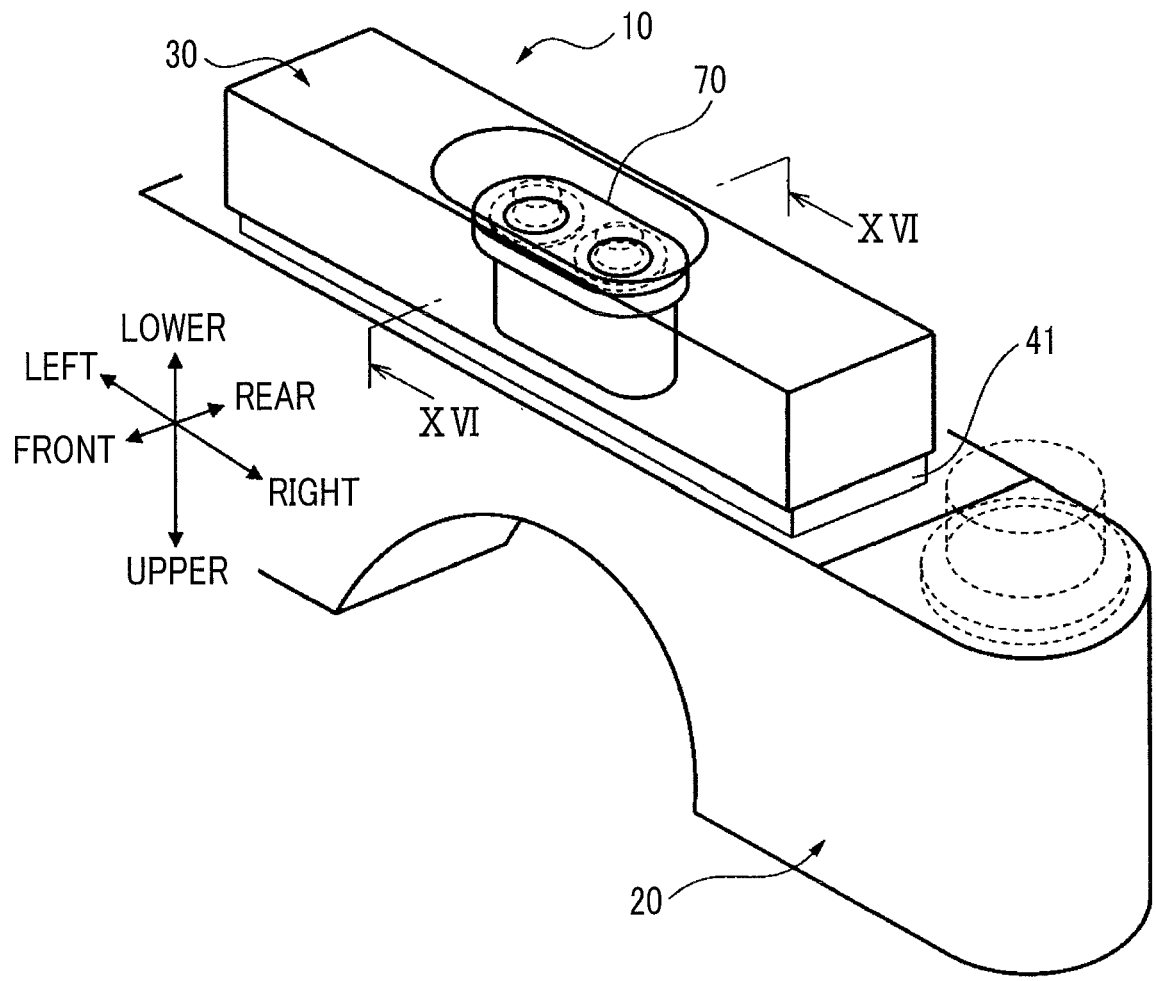
FIG. 15 is a perspective view illustrating the crank cap assembly according to a fourth embodiment.
Figure 16:
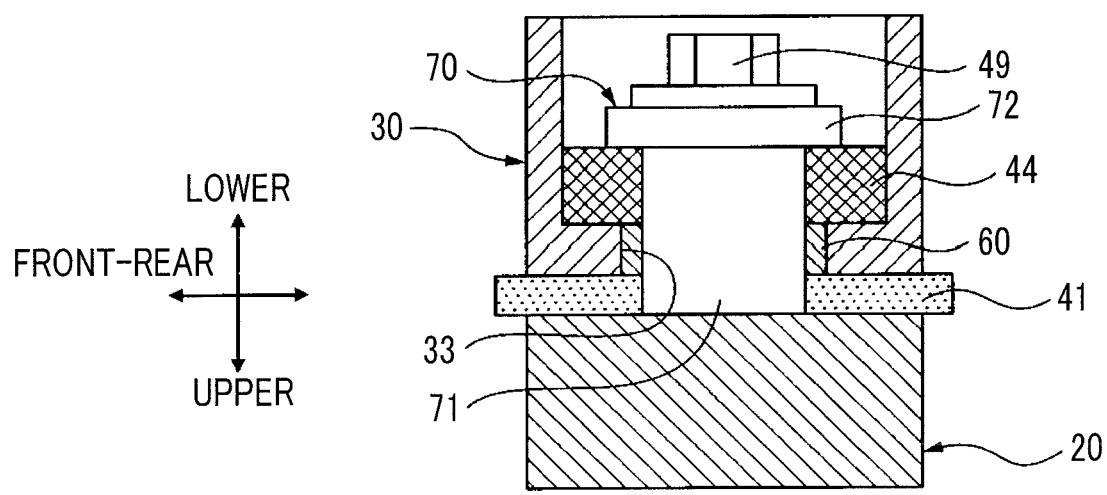
FIG. 16 is a partial sectional view of the crank cap assembly according to the fourth embodiment viewed along line XVI-XVI of FIG. 15.

FIG. 15 is a perspective view illustrating the crank cap assembly 10 according to the fourth embodiment. FIG. 16 is a partial sectional view of the crank cap assembly 10 according to the fourth embodiment, which is viewed along line XVI-XVI of FIG. 15. The upper and the lower are reversed in FIGS. 15 and 16.

As illustrated in FIG. 15, in the crank cap assembly 10 according to the fourth embodiment, the mass portion 30 is provided with one recessed portion 34 for a head and one body through hole 33 is formed in the recessed portion 34 for a head of the mass portion 30. In the crank cap 20, two bolt holes (not illustrated) for receiving the attachment bolt 49 are formed in the lower surface of the crank cap 20, separated from each other in the right-left direction.

In the crank cap assembly 10 according to the fourth embodiment, the elastic supporter 40 is provided with one collar 70 and the collar 70 is provided with a tubular portion 71 and a flange portion 72. The tubular portion 71 is formed to have an oval outer section and has a size allowing the tubular portion 71 to be accommodated in the body through hole 33 foliated in the mass portion 30. Two through holes separated from each other in the right-left direction are formed in the tubular portion 71, and the attachment bolts 49 are disposed to respectively extend in the through holes. The flange portion 72 is disposed at one end of the tubular portion 71 and is formed to extend toward the outside from the outer surface of the tubular portion 71.

In the crank cap assembly 10 according to the fourth embodiment, the first elastic body 41, the second elastic body 44, and the third elastic body 60 are formed as separate bodies. Accordingly, in the fourth embodiment, the first elastic body 41, the second elastic body 44, and the third elastic body 60 are formed of rubber different in elastic modulus. Also in the fourth embodiment, the first elastic body 41, the second elastic body 44, and the third elastic body 60 may be integrally formed.

In the crank cap assembly 10 according to the fourth embodiment, the mass portion 30 includes no extending portion unlike in the first embodiment and so on. However, the mass portion 30 according to the fourth embodiment may also be provided with an extending portion.

The crank cap 20 is provided with the recessed portion 21, and thus the crank cap 20 has a small upper-lower-direction thickness in the middle portion thereof in the right-left direction. Accordingly, no strength that is sufficient to support the crankshaft 5 can be maintained when the thickness of the middle portion of the crank cap 20 is reduced. When the thickness of the middle portion of the crank cap 20 is increased, the space for disposition of the mass portion 30 is reduced to the same extent and no sufficient weight can be provided for the mass portion 30, and then the damping effect of the elastic supporter 40 may be reduced.

In the crank cap assembly 10 according to the fourth embodiment, in contrast, the collar 45 extends between two attachment bolts 49. Accordingly, the middle portion of the crank cap 20 in the right-left direction can be reinforced by the two attachment bolts 49 and the collar 45. As a result, the thickness of the middle portion of the crank cap 20 can be reduced, and thus the weight of the mass portion 30 can be sufficient.

In the crank cap assembly 10 according to the fourth embodiment, the elastic supporter 40 is provided with the two attachment bolts 49. However, the number of the attachment bolts 49 may be three or more as well. Although not particularly limited, it is desirable in this case that one body through hole 33 is formed in the mass portion 30 and the elastic supporter 40 is provided with one collar 70. In this case, three or more through holes corresponding to the number of the attachment bolts 49 are formed in the tubular portion 71 of the collar 70.

Fifth Embodiment

The crank cap assembly 10 according to a fifth embodiment will be described below with reference to FIGS. 17 and 18. Basically, the crank cap assembly according to the fifth embodiment is similar in configuration to the crank cap assembly according to the first to fourth embodiments. Accordingly, the following description will focus on parts of the crank cap assembly according to the fifth embodiment that differ in configuration from the crank cap assembly according to the first to fourth embodiments.

Figure 17:
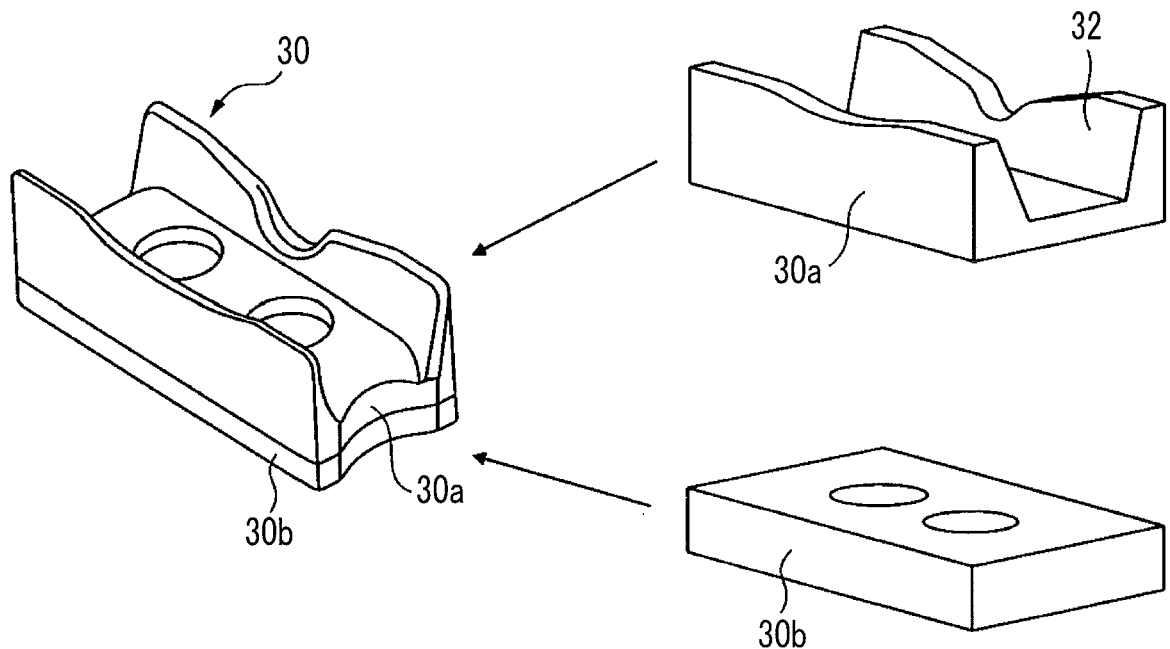
FIG. 17 is a perspective view schematically illustrating the mass portion used in the crank cap assembly according to a fifth embodiment.

FIG. 17 is a perspective view schematically illustrating the mass portion 30 used in the crank cap assembly 10 according to the fifth embodiment. Two states are illustrated in FIG. 17, one being a state where the mass portion 30 is assembled and the other being a state where the mass portion 30 is disassembled.

As illustrated in FIG. 17, the mass portion 30 according to the fifth embodiment is divided into a plurality of parts in the upper-lower direction (divided into two in the illustrated example). Accordingly, the mass portion 30 according to the fifth embodiment is provided with a first partial mass portion 30a on the upper side and a second partial mass portion 30b on the lower side. The first partial mass portion 30a is provided with the upper side part of the body portion 31 and the extending portion 32. The second partial mass portion 30b is provided with the lower side part of the body portion 31 and a recessed portion for a head (not illustrated) formed at the lower side part of the body portion 31.

In the elastic supporter 40 configured as described above, the first partial mass portion 30a and the second partial mass portion 30b are supported at different spring constants with respect to the crank cap 20 in at least one of the front-rear direction and the right-left direction. The spring constant of the first partial mass portion 30a changes in accordance with the transverse elastic modulus of the first elastic body 41 and the mass of the first partial mass portion 30a, and the spring constant of the second partial mass portion 30b changes in accordance with the transverse elastic modulus of the second elastic body 44 and the mass of the second partial mass portion 30b. Accordingly, the transverse elastic modulus of the first elastic body 41 and the second elastic body 44, the mass of the first partial mass portion 30a, and the mass of the second partial mass portion 30b are set such that the first partial mass portion 30a and the second partial mass portion 30b are elastically supported at spring constants different from each other.

As illustrated in FIG. 17, in the fifth embodiment, both the surface of the first partial mass portion 30a on the second partial mass portion 30b side and the surface of the second partial mass portion 30b on the first partial mass portion 30a side are formed in a planar shape. However, the surfaces do not necessarily have to be formed on a plane. Accordingly, the surfaces may have, for example, a projecting portion, a recessed portion, and a step. In this case, both surfaces may have shapes complementary to each other (in a case where a projecting portion is formed on the surface of the first partial mass portion 30a, for example, a recessed portion complementary to the projecting portion may be formed in the surface of the second partial mass portion 30b).

According to the fifth embodiment, the two partial mass portions 30a, 30b of the mass portion 30 are elastically supported at spring constants different from each other. As a result, the first partial mass portion 30a and the second partial mass portion 30b are capable of dampening the vibration of the crank cap 20 in the front-rear direction and the vibration of the crank cap 20 in the right-left direction that have different frequencies.

Figure 18:
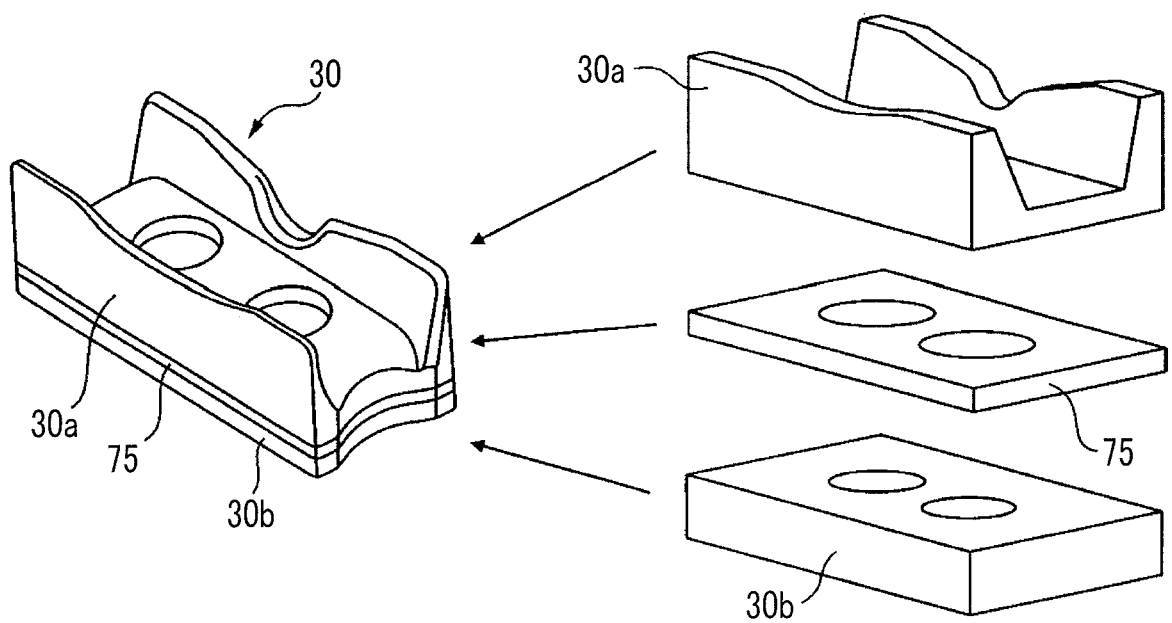
FIG. 18 is a perspective view schematically illustrating the mass portion used in the crank cap assembly according to a modification example of the fifth embodiment.

FIG. 18 is a perspective view schematically illustrating the mass portion 30 used in the crank cap assembly 10 according to a modification example of the fifth embodiment. As illustrated in FIG. 18, in the modification example of the fifth embodiment, the elastic supporter 40 is provided with a sixth elastic body 75 disposed between the partial mass portions 30a, 30b that are next to each other. The sixth elastic body 75 may be coupled to the two partial mass portions 30a, 30b. The sixth elastic body 75 elastically supports the second partial mass portion 30b with respect to the first partial mass portion 30a.

In the modification example of the fifth embodiment, the sixth elastic body 75 is formed of rubber that has the same elastic modulus and is formed of the same material throughout. However, the sixth elastic body 75 may also be formed to have different elastic moduli in the front-rear direction and the right-left direction. In this case, the sixth elastic body 75 may be formed by joining of a plurality of rubber pieces that have different elastic moduli or may be foamed by the component of the rubber being changed during manufacturing for different elastic moduli in the front-rear direction and the right-left direction.

Sixth Embodiment

Figure 19:
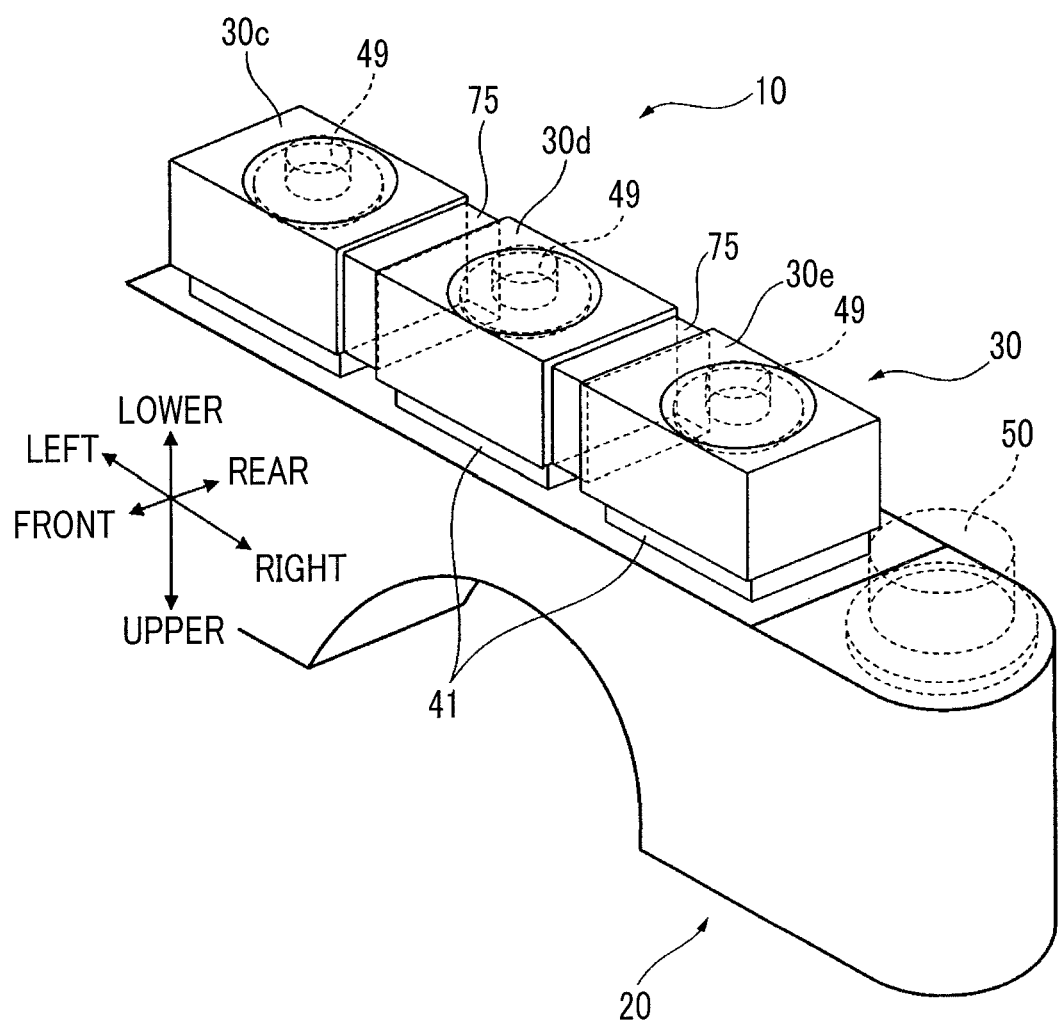
FIG. 19 is a perspective view schematically illustrating the crank cap assembly according to a sixth embodiment.

The crank cap assembly 10 according to a sixth embodiment will be described below with reference to FIG. 19. Basically, the crank cap assembly according to the sixth embodiment is similar in configuration to the crank cap assembly according to the first to fifth embodiments. Accordingly, the following description will focus on parts of the crank cap assembly according to the sixth embodiment that differ in configuration from the crank cap assembly according to the first to fifth embodiments. FIG. 19 is a perspective view schematically illustrating the crank cap assembly 10 according to the sixth embodiment. The upper and the lower are reversed in FIG. 19.

As illustrated in FIG. 19, the mass portion 30 according to the sixth embodiment is divided into a plurality of parts in the right-left direction (divided into three in the illustrated example). Accordingly, the mass portion 30 according to the sixth embodiment is provided with a second partial mass portion 30d in the middle in the right-left direction and a first partial mass portion 30c and a third partial mass portion 30e disposed on both sides of the second partial mass portion 30d in the right-left direction.

Each of the partial mass portions 30c, 30d, 30e is provided with the body through hole 33 (not illustrated in FIG. 19) penetrated by the attachment bolt 49 and the recessed portion 34 for a head (not illustrated in FIG. 19) formed below the body through hole 33. The head of the attachment bolt 49 is partially accommodated in the recessed portion 34 for a head, and the second elastic body 44 (not illustrated) is disposed between the head of the attachment bolt 49 and each of the partial mass portions 30c, 30d, 30e. The plurality of second elastic bodies 44 may have different elastic moduli or may have the same elastic modulus.

The first elastic body 41 is disposed between the crank cap 20 and each of the partial mass portions 30c, 30d, 30e. As illustrated in FIG. 19, the first elastic body 41 is divided into a plurality of parts in the right-left direction and the divided parts of the first elastic body 41 are disposed adjacent to the partial mass portions 30c, 30d, 30e respectively corresponding thereto. The plurality of first elastic bodies 41 may have different elastic moduli or may have the same elastic modulus.

In the sixth embodiment, the elastic supporter 40 is provided with the sixth elastic body 75 disposed between the partial mass portions 30c, 30d, 30e that are next to each other. The sixth elastic body 75 may be coupled to the partial mass portions on both sides. The sixth elastic body 75 elastically supports one of the partial mass portions 30c, 30d, 30e that are next to each other with respect to the rest.

In the sixth embodiment, the elastic supporter 40 may not be provided with the sixth elastic body. In this case, the partial mass portions 30c, 30d, 30e that are next to each other may be disposed such that the surfaces thereof that face each other are in contact with each other or may be disposed such that the surfaces are separated from the difference.

The elastic supporter 40 is formed such that at least one of the partial mass portions 30c, 30d, 30e is supported with respect to the crank cap 20 at a spring constant different from that of the rest of the partial mass portions 30c, 30d, 30e at least in the front-rear direction. Especially, in the sixth embodiment, the first partial mass portion 30c and the third partial mass portion 30e are supported at similar spring constants and the second partial mass portion 30d is supported at a spring constant different from that of the first partial mass portion 30c and the third partial mass portion 30e.

As described above, the resonant vibration in the front-rear direction that occurs in the crank cap 20 includes pivoting resonance and front-rear bending resonance. Of the pivoting resonance and the front-rear bending resonance, the crank cap 20 as a whole vibrates in the front-rear direction in the pivoting resonance whereas merely the right-left-direction middle portion of the crank cap 20 vibrates in the front-rear direction in the front-rear bending resonance.

In the sixth embodiment, the mass portion 30 is divided into a plurality of parts in the right-left direction. Accordingly, with respect to the pivoting resonance, the vibration can be suppressed mainly by the first partial mass portion 30c and the third partial mass portion 30e that are disposed on the right and the left. Meanwhile, in the front-rear bending resonance, the vibration can be suppressed mainly by the second partial mass portion 30d disposed in the middle. As a result, according to the sixth embodiment, both the pivoting resonance and the front-rear bending resonance can be suppressed. The mass and the shape of the first partial mass portion 30c, the mass and the shape of the third partial mass portion 30e, the elastic modulus and so on of the first elastic body 41, the second elastic body 44, the sixth elastic body 75, and the like for supporting the first and third partial mass portions 30c, 30e are set from such a viewpoint and such that it is possible to more suppress pivoting resonant vibration effectively.

Seventh Embodiment

Figure 20:
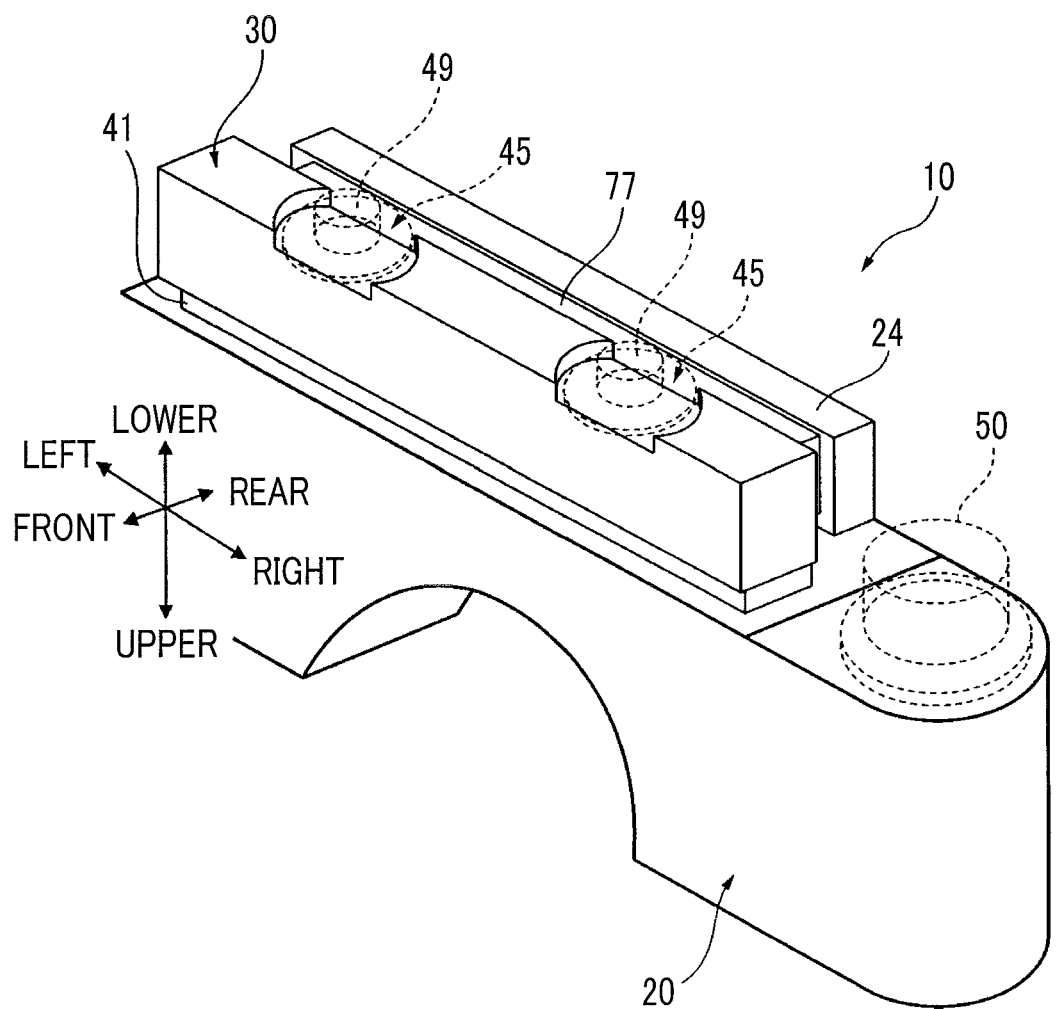
FIG. 20 is a perspective view schematically illustrating the crank cap assembly according to a seventh embodiment.

The crank cap assembly 10 according to a seventh embodiment will be described below with reference to FIG. 20. Basically, the crank cap assembly according to the seventh embodiment is similar in configuration to the crank cap assembly according to the first to sixth embodiments. Accordingly, the following description will focus on parts of the crank cap assembly according to the seventh embodiment that differ in configuration from the crank cap assembly according to the first to sixth embodiments. FIG. 20 is a perspective view schematically illustrating the crank cap assembly 10 according to the seventh embodiment. The upper and the lower are reversed in FIG. 20.

As illustrated in FIG. 20, the crank cap assembly 10 according to the seventh embodiment is provided with a protruding wall 24 protruding downwards from the lower surface of the crank cap 20. As illustrated in FIG. 20, the protruding wall 24 extends in the right-left direction between the two cap bolts 50. The protruding wall 24 protrudes from the lower surface of the crank cap 20 in one end portion in the front-rear direction (end portion on the rear side in the example illustrated in FIG. 20).

The elastic supporter 40 according to the seventh embodiment is provided with an eighth elastic body 77 disposed between the mass portion 30 and the protruding wall 24 in the front-rear direction. The eighth elastic body 77 is disposed to be in contact with the rear surface (or the front surface) of the mass portion 30 and the front surface (or the rear surface) of the protruding wall 24. As is the case with the protruding wall 24, the eighth elastic body 77 extends in the right-left direction between the two cap bolts 50.

The eighth elastic body 77 is formed of rubber that has the same elastic modulus and is formed of the same material throughout. However, the eighth elastic body 77 may also be formed to have different elastic moduli in the right-left direction and the upper-lower direction.

According to the seventh embodiment, the eighth elastic body 77 is capable of elastically supporting the mass portion 30 in the front-rear direction. However, the eighth elastic body 77 is not tightened between the mass portion 30 and the protruding wall 24 by a bolt or the like. Accordingly, the mass portion 30 is not elastically supported by the shear-direction elasticity of the eighth elastic body 77. Therefore, according to the seventh embodiment, it is possible to adjust the spring constant of elastic support in the front-rear direction of the mass portion 30 without changing the spring constant of elastic support in the right-left direction and the upper-lower direction of the mass portion 30.

Eighth Embodiment

The internal combustion engine 1 according to an eighth embodiment will be described below with reference to FIGS. 21 and 22. Basically, the internal combustion engine according to the eighth embodiment is similar in configuration to the internal combustion engine provided with the crank cap according to the first to seventh embodiments. Accordingly, the following description will focus on parts of the internal combustion engine according to the eighth embodiment that differ in configuration from the internal combustion engine provided with crank cap according to the first to seventh embodiments.

Figure 21:
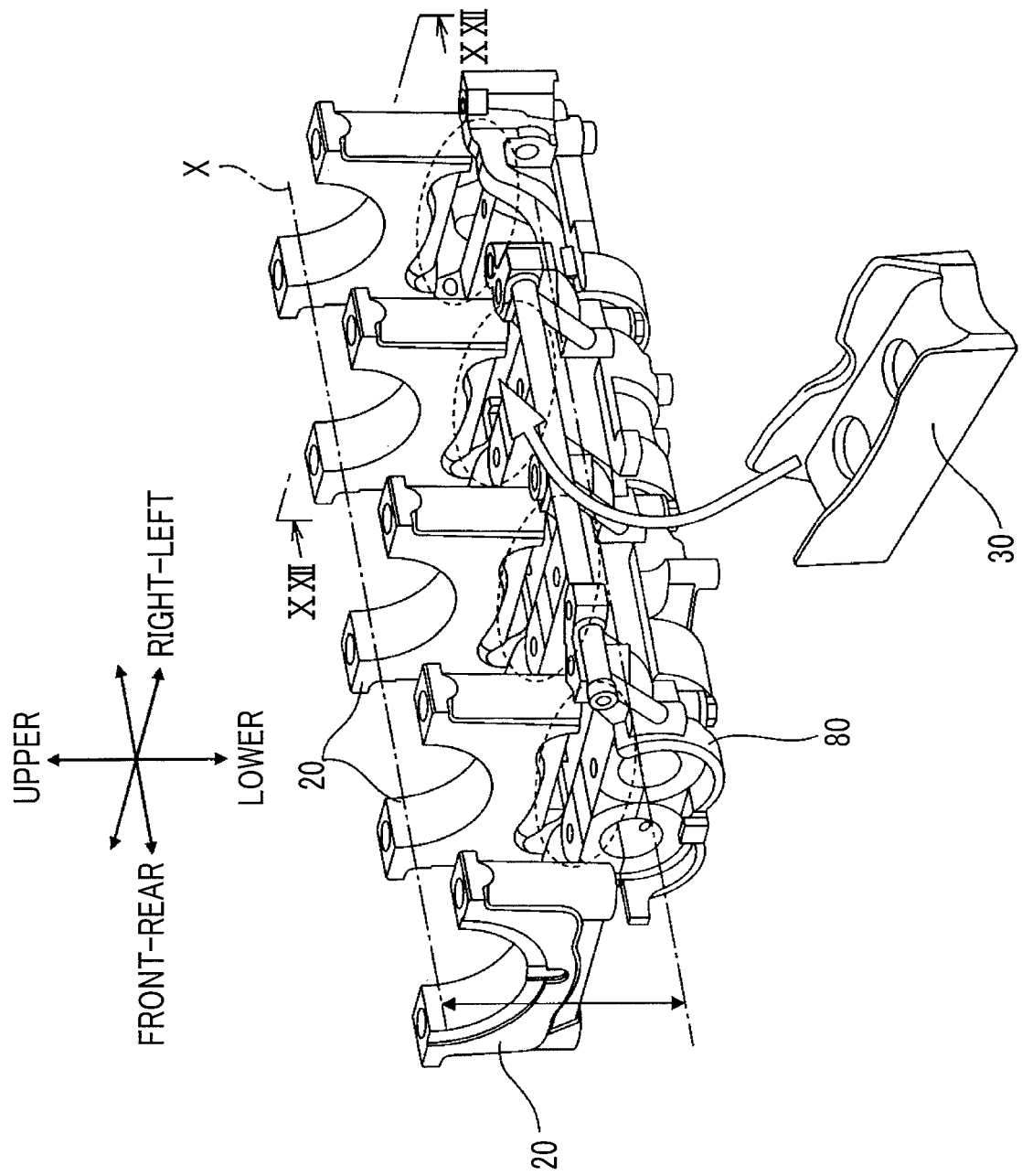
FIG. 21 is a perspective view schematically illustrating a lower region of an internal combustion engine.

FIG. 21 is a perspective view schematically illustrating the lower region of the internal combustion engine 1. FIG. 22 is a schematic sectional view around the crank cap assembly 10 viewed along line XXII-XXII of FIG. 21.

FIG. 21 is a diagram schematically illustrating the lower region of the in-line four-cylinder internal combustion engine 1. Accordingly, the internal combustion engine 1 is provided with five crank cap assemblies 10. Therefore, the internal combustion engine 1 is provided with five crank caps 20 as illustrated in FIG. 21. The crank cap assembly 10 is attached to the cylinder block 2 such that the crank cap 20 rotatably supports the crankshaft 5. The crank cap assemblies 10 are equally spaced in a row along a rotation axis X of the crankshaft 5.

The internal combustion engine 1 is provided with a balance shaft supporter 80 supporting a balance shaft (not illustrated), which is adjacent to the crankshaft 5 below the crankshaft 5. The balance shaft of the balance shaft supporter 80 is mechanically connected by a gear or the like to the crankshaft 5 and rotates in accordance with rotation of the crankshaft 5. By the balance shaft rotating, the vibration that occurs in the internal combustion engine 1 as a result of the rotation of the crankshaft 5 can be suppressed.

The crankshaft 5 and the balance shaft are connected by a gear, and thus a certain gap is needed between the crankshaft 5 and the balance shaft. Accordingly, the crank cap 20 and the balance shaft supporter 80 have some space therebetween. As illustrated in FIG. 21, in the present embodiment, the elastic supporter 40 including the mass portion 30 is disposed in the space.

Figure 22:
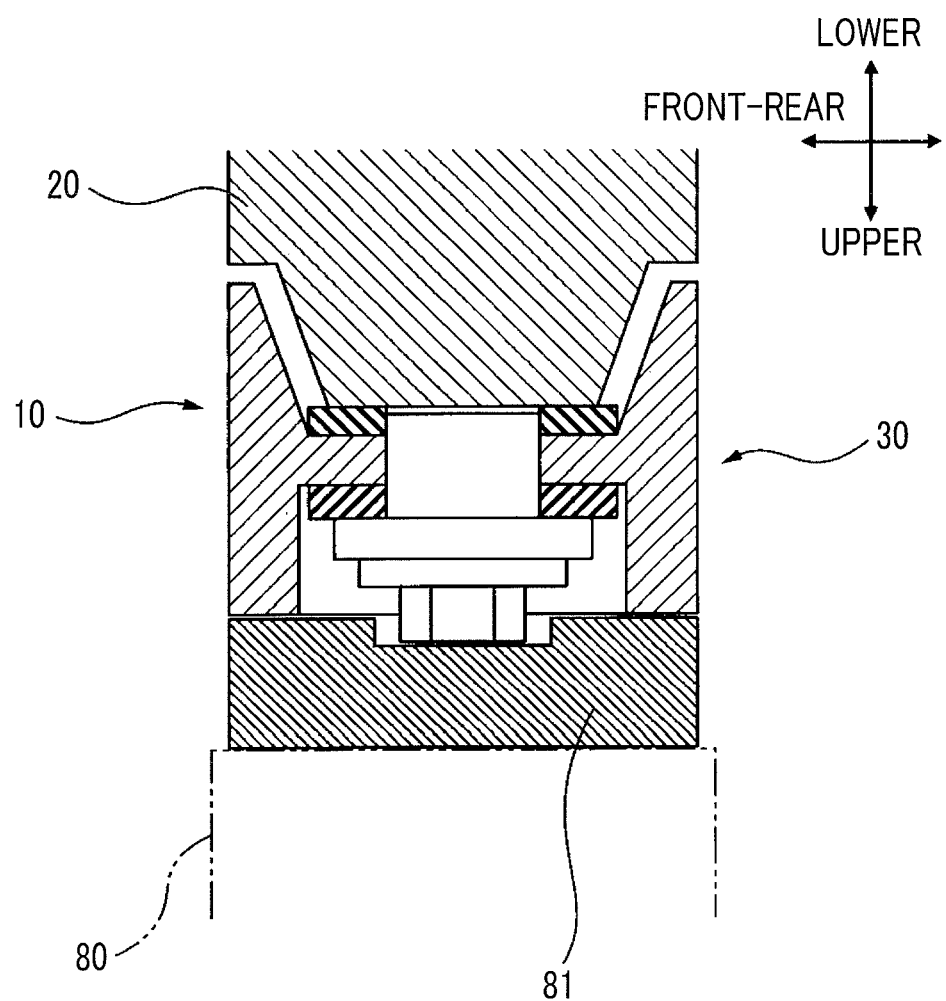
FIG. 22 is a schematic sectional view around the crank cap assembly viewed along line XXII-XXII of FIG. 21.

As illustrated in FIG. 22, in the present embodiment, a seventh elastic body 81 is disposed between the balance shaft supporter 80 and the mass portion 30 of the crank cap assembly 10. The seventh elastic body 81 is disposed to be in contact with both the lower surface of the mass portion 30 and the upper surface of the balance shaft supporter 80. The mass portion 30 is elastically supported with respect to the balance shaft supporter 80 by the seventh elastic body 81.

The seventh elastic body 81 is formed of rubber similar to the rubber of the first elastic body 41 and the second elastic body 44. Accordingly, the seventh elastic body 81 has the same elastic modulus as the first elastic body 41 and the second elastic body 44.

As described above, the second elastic body 44 is more likely to cause creep deformation than the first elastic body 41. According to the present embodiment, the mass portion 30 is supported by the seventh elastic body 81, and thus the mass of the mass portion 30 is supported in a dispersed manner by the second elastic body 44 and the seventh elastic body 81. As a result, creep deformation of the second elastic body 44 can be suppressed.

In the above embodiment, the seventh elastic body 81 is disposed between the mass portion 30 and the balance shaft supporter 80. In an alternative example, a structural body extending downwards from the mass portion 30 may be disposed in the oil pan of the internal combustion engine 1 and the seventh elastic body 81 may be disposed between the structural body and the mass portion 30. Accordingly, in the present embodiment, it can be said that the seventh elastic body is disposed between the mass portion 30 and a structural body (including the balance shaft supporter 80) disposed in the internal combustion engine below the crankshaft 5.

The seventh elastic body 81 may also be formed of rubber that is different from the rubber of the first elastic body 41 and the second elastic body 44. Although not particularly limited, it is desirable in this case that the seventh elastic body 81 is formed of rubber smaller in elastic modulus than the first elastic body 41 and the second elastic body 44.

The distance between the upper surface of the balance shaft supporter 80 and the lower surface of the mass portion 30 is subjected to variation between, for example, respective solids of the internal combustion engine depending on manufacturing tolerance and so on. Accordingly, when the seventh elastic body 81 has an excessively large elastic modulus, the spring constant with which the mass portion 30 is supported may differ between, for example, respective solids of the internal combustion engine. By the elastic modulus of the seventh elastic body 81 being reduced as described above, the spring constant with which the mass portion 30 is supported does not significantly change even in the event of some variation.

Ninth Embodiment

The internal combustion engine 1 according to a ninth embodiment will be described below with reference to FIG. 23. Basically, the internal combustion engine according to the ninth embodiment is similar in configuration to the internal combustion engine provided with the crank cap assembly according to the first to seventh embodiments and the internal combustion engine according to the eighth embodiment. Accordingly, the following description will focus on parts of the internal combustion engine according to the ninth embodiment that differ in configuration from the internal combustion engine provided with the crank cap assembly according to the first to seventh embodiments and the internal combustion engine according to the eighth embodiment.

Figure 23:
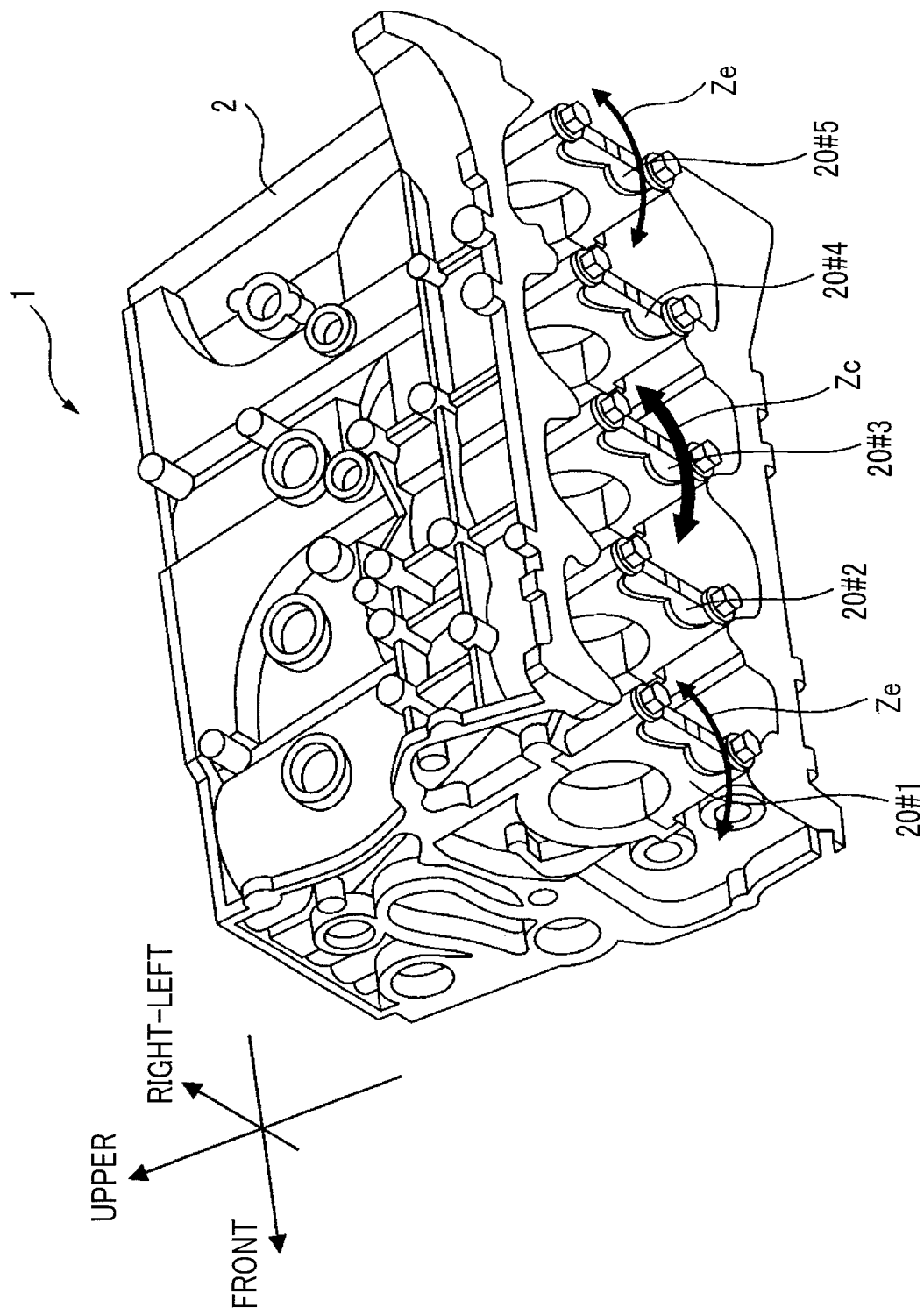
FIG. 23 is a schematic perspective view in which a cylinder block is viewed from below.

FIG. 23 is a schematic perspective view in which the cylinder block 2 is viewed from below. Illustrated in FIG. 23 is a state where the crank cap 20 is not provided with the elastic supporter 40. FIG. 23 is a diagram schematically illustrating the cylinder block 2 of the in-line four-cylinder internal combustion engine 1. Accordingly, the internal combustion engine 1 is provided with five crank cap assemblies 10. Therefore, the internal combustion engine 1 is provided with five crank caps 20 as illustrated in FIG. 23.

The crank cap assembly 10 is attached to the cylinder block 2 such that the crank cap 20 rotatably supports the crankshaft 5. The crank cap assemblies 10 are equally spaced in a row along the rotation axis of the crankshaft 5. In FIG. 23, the crank caps 20 are attached to the cylinder block 2 in the order of No. 1 crank cap 20 #1 to No. 5 crank cap 20 #5 from the front to the rear.

In the ninth embodiment, in the mass portion 30 of No. 3 crank cap assembly 10 #3 disposed in the middle in the front-rear direction of the internal combustion engine 1 (that is, the crank cap assembly provided with No. 3 crank cap 20 #3, hereinafter, referred to as the "crank cap"), the resonance frequency of the mass portion of No. 3 crank cap assembly 10 #3 is higher than the resonance frequency of the mass portions 30 of No. 1 crank cap assembly 10 #1 and No. 5 crank cap assembly 10 #5 disposed at both ends of the engine body in the front-rear direction.

As described above, the resonance frequency of the mass portion 30 changes as a result of, for example, a change in the elastic modulus of the first elastic body 41 and the second elastic body 44 of the elastic supporter 40. In general, the resonance frequency increases as the elastic modulus increases. In a case where the first elastic body 41 and the second elastic body 44 are formed of rubber, in particular, the elastic modulus can be increased by the hardness of the rubber being increased. Accordingly, in the ninth embodiment, the hardness of the rubber of the first elastic body 41 and the second elastic body 44 is adjusted such that, for example, the hardness of the first elastic body 41 and the second elastic body 44 of No. 3 crank cap assembly 10 #3 is higher than the hardness of the first elastic body 41 and the second elastic body 44 of No. 1 crank cap assembly 10 #1 and No. 5 crank cap assembly 10 #5.

The rigidity of the cylinder block 2 is low in both end portions of the internal combustion engine 1 in the front-rear direction since the end portions are open ends. In contrast, the rigidity of the cylinder block 2 is high in the middle portion of the internal combustion engine 1 in the front-rear direction. As a result, the vibration of the crank cap 20 in the middle portion of the internal combustion engine 1 in the front-rear direction (Zc in the drawing) is higher in resonance frequency than the vibration of the crank cap 20 in both end portions of the internal combustion engine 1 in the front-rear direction (Ze in the drawing).

In the ninth embodiment, the resonance frequency of the mass portion 30 of No. 3 crank cap assembly 10 #3 is higher than the resonance frequency of the mass portions 30 of No. 1 crank cap assembly 10 #1 and No. 5 crank cap assembly 10 #5. As a result, according to the ninth embodiment, the resonant vibration of each crank cap 20 can be more suppressed effectively.

In the ninth embodiment, the resonance frequency is adjusted by adjustment of the hardness of the rubber of the first elastic body 41 and the second elastic body 44. However, the resonance frequency may also be adjusted by a change in, for example, the mass and the structure of another elastic body or the mass portion 30.

What is claimed is:

1. A crank cap assembly provided with a crank cap rotatably supporting a crankshaft, the crank cap assembly comprising:
    a mass portion;
    two cap bolts fixing the crank cap to an engine body; and
    an elastic supporter disposed between the two cap bolts, the elastic supporter elastically supporting the mass portion with respect to the crank cap in an axial direction of the crankshaft, wherein
        the elastic supporter includes an attachment bolt attaching the mass portion to the crank cap, and a first elastic body disposed between the mass portion and the crank cap,
        the mass portion has a through hole penetrating the mass portion,
        the attachment bolt extends through the through hole and attaches the mass portion to the crank cap such that the first elastic body is sandwiched between the mass portion and the crank cap,
        the first elastic body is rubber, and
        an elastic modulus of a middle portion of the first elastic body is larger than an elastic modulus of both of first end portions of the first elastic body in the axial direction of the crankshaft.

2. The crank cap assembly according to claim 1, wherein:
    the elastic modulus of the middle portion of the first elastic body is larger than an elastic modulus of both of second end portions of the first elastic body in a cap extension direction perpendicular to an attachment direction in which the crank cap is attached to the engine body.

3. The crank cap assembly according to claim 1, wherein:
    the mass portion includes a protruding portion protruding toward the first elastic body formed in a middle portion of the mass portion in the axial direction of the crankshaft and a cap extension direction perpendicular to an attachment direction in which the crank cap is attached to the engine body.

4. The crank cap assembly according to claim 1, wherein the elastic supporter further includes a second elastic body disposed between the mass portion and a head of the attachment bolt.

5. The crank cap assembly according to claim 4, wherein:
    the first elastic body and the second elastic body are rubber; and
    the second elastic body is higher in hardness than the first elastic body.

6. The crank cap assembly according to claim 4, wherein:
    the elastic supporter includes at least two attachment bolts, and a collar disposed between the second elastic body and the head of the attachment bolts; and
    the collar is disposed such that the at least two attachment bolts penetrate the collar.

7. The crank cap assembly according to claim 4, wherein:
    the elastic supporter further includes a third elastic body; and
    the third elastic body is rubber disposed between the attachment bolt and an inner surface of the through hole.

8. The crank cap assembly according to claim 7, wherein the first elastic body, the second elastic body, and the third elastic body are rubber and a single member.

9. The crank cap assembly according to claim 1, wherein the elastic supporter further includes a fourth elastic body disposed between a head of the cap bolt and the mass portion.

10. The crank cap assembly according to claim 1, wherein:
    the mass portion includes a recessed portion; and
    a head of the attachment bolt is received in the recessed portion at least in part.

11. The crank cap assembly according to claim 1, wherein:
    the mass portion includes a body portion, and two extending portions extending in parallel toward an outside from the body portion; and
    the crank cap is disposed such that a part of the crank cap is received between the two extending portions.

12. The crank cap assembly according to claim 11, wherein the elastic supporter includes a fifth elastic body disposed between the extending portion and the crank cap.

13. The crank cap assembly according to claim 1, wherein:
    the mass portion includes a plurality of partial mass portions divided in an attachment direction in which the crank cap is attached to the engine body; and
    the partial mass portions are configured to be supported with respect to the crank cap at spring constants different from each other in the axial direction of the crankshaft.

14. The crank cap assembly according to claim 13, wherein a sixth elastic body is provided between the partial mass portions next to each other.

15. The crank cap assembly according to claim 1, wherein:
    the mass portion includes a plurality of partial mass portions divided in the axial direction of the crankshaft and a cap extension direction perpendicular to an attachment direction in which the crank cap is attached to the engine body; and
    at least one of the partial mass portions is configured to be supported with respect to the crank cap at a spring constant different from a spring constant of a rest of the partial mass portions in the axial direction of the crankshaft.

16. The crank cap assembly according to claim 15, wherein a sixth elastic body is provided between the partial mass portions next to each other.

17. The crank cap assembly according to claim 1, wherein
    the elastic supporter is configured so as to elastically support the mass portion at a different spring constant in three directions, the three directions being the axial direction of the crankshaft, an attachment direction in which the crank cap is attached to the engine body, and a cap extension direction, and
    the cap extension direction is perpendicular to both the axial direction and the attachment direction.

18. The crank cap assembly according to claim 17, wherein the elastic supporter is formed such that the spring constant increases in an order of the axial direction, the cap extension direction, and the attachment direction.

19. An internal combustion engine comprising:
    a plurality of the crank cap assemblies according to claim 1; and
    a crankshaft, wherein
        the crankshaft is rotatably attached to the engine body by the crank cap assemblies disposed in a row, a seventh elastic body is provided between the mass portion of the crank cap assembly and the engine body, and the mass portion is elastically supported on the engine body by the seventh elastic body.

20. An internal combustion engine comprising
a plurality of the crank cap assemblies according to claim 1, wherein
the crankshaft is rotatably attached to the engine body by the crank cap assemblies disposed in a row, and
the crank cap assembly disposed in a middle portion of the engine body in the axial direction of the crankshaft is configured such that a resonance frequency of the mass portion of the crank cap assembly is higher than resonance frequencies of the mass portions of the crank cap assemblies disposed in both end portions of the engine body in the axial direction of the crankshaft.

\* \* \* \* \*